US006312787B1

(12) United States Patent
Hayashi et al.

(10) Patent No.: US 6,312,787 B1
(45) Date of Patent: Nov. 6, 2001

(54) RESIN SHEET, PROCESS AND APPARATUS FOR PRODUCING SAME, SURFACE LIGHT SOURCE ELEMENT AND LAMINATE

(75) Inventors: Yasuko Hayashi; Masaharu Oda; Issei Chiba, all of Kawasaki (JP)

(73) Assignee: Mitsubishi Rayon Co., Ltd., Tokyo (JP)

( * ) Notice: Subject to any disclaimer, the term of this patent is extended or adjusted under 35 U.S.C. 154(b) by 0 days.

(21) Appl. No.: 09/543,910

(22) Filed: Apr. 6, 2000

Related U.S. Application Data

(62) Division of application No. 08/981,170, filed as application No. PCT/JP96/01319 on May 17, 1996, now abandoned.

(30) Foreign Application Priority Data

Jun. 14, 1995 (JP) .................................... 7-147480
Jun. 14, 1995 (JP) .................................... 7-147481

(51) Int. Cl.[7] ................................ F21V 5/00; F21V 7/04; G01D 11/28
(52) U.S. Cl. ........................ 428/156; 428/161; 428/172; 428/212; 362/26; 362/31; 362/331; 385/901
(58) Field of Search ........................ 362/31, 26, 331; 428/156, 161, 142, 172, 212, 522, 412, 30; 349/65; 385/901

(56) References Cited

U.S. PATENT DOCUMENTS

| 4,415,509 | * | 11/1983 | Toyooka et al. ..................... 264/1.3 |
| 5,211,898 | | 5/1993 | Shinmoto ............................. 264/171 |
| 5,280,384 | * | 1/1994 | Shibasaki ............................. 359/396 |
| 5,442,523 | | 8/1995 | Kashima et al. ..................... 362/31 |
| 5,704,703 | * | 1/1998 | Yamada et al. ..................... 362/27 |
| 5,899,552 | * | 5/1999 | Yokoyama et al. ................. 362/31 |

FOREIGN PATENT DOCUMENTS

| 0 317 250 | 5/1989 | (EP) . |
| 2115742 | 9/1983 | (GB) . |
| 1-229698 | 9/1989 | (JP) . |
| 2-84618 | 3/1990 | (JP) . |
| 3-256735 | 11/1991 | (JP) . |
| 4-17931 | 2/1992 | (JP) . |
| 5-127159 | 5/1993 | (JP) . |
| 5-278157 | 10/1993 | (JP) . |
| 6-273752 | 9/1994 | (JP) . |
| 7-36742 | 8/1995 | (JP) . |
| 8-142149 | 6/1996 | (JP) . |
| 8-197670 | 8/1996 | (JP) . |

* cited by examiner

Primary Examiner—Paul Thibodeau
Assistant Examiner—Ramsey Zacharia
(74) Attorney, Agent, or Firm—Finnegan, Henderson, Farabow, Garrett & Dunner, L.L.P.

(57) ABSTRACT

A resin sheet having laminated transparent resin layers and a smooth outer surface, the refractive indexes of two resins of any adjacent two resin layers differing from each other, the interfaces among the resin layers having an uneven shape, is produced with an extrusion molding apparatus having such a structure that a plurality of transparent resins are extruded from respective separate flow passages into a composite resin flow passage to form a composite resin flow having a laminate structure with an uneven shape at the interfaces of the resin layers, and that the composite resin flow is extruded from an outlet of the composite resin flow passage. The resin sheet is used as a laminate, or a light guide of a surface light source element.

6 Claims, 23 Drawing Sheets

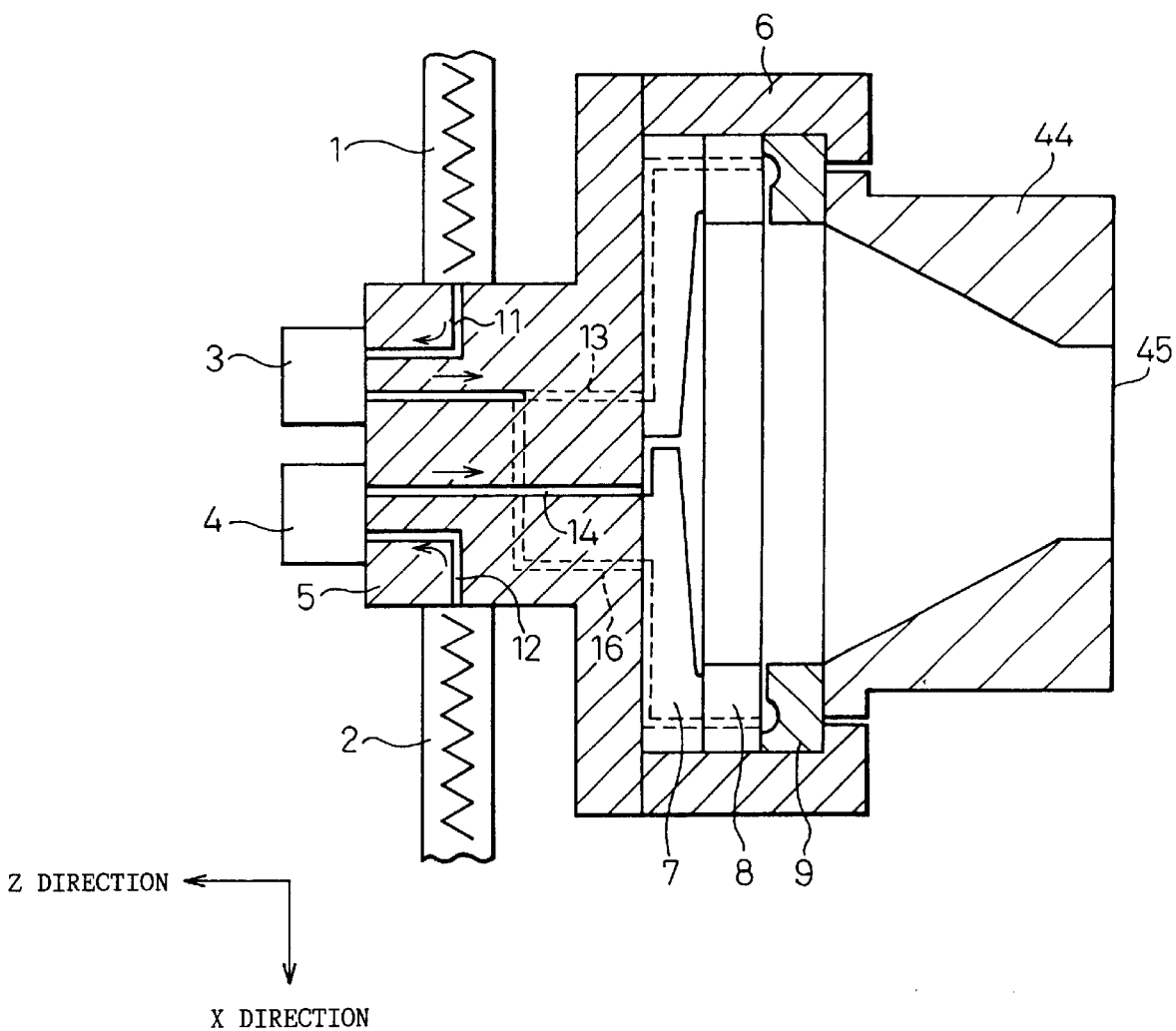

RESIN SHEET, PROCESS AND APPARATUS FOR PRODUCING SAME, SURFACE LIGHT SOURCE ELEMENT AND LAMINATE

This is a division of application Ser. No. 08/981,170, filed Mar. 17, 1998, now abandoned, which is a 371 of PCT/JP96/01319 filed May 17, 1996, both of which are incorporated herein by reference.

TECHNICAL FIELD

The present invention relates to such a resin sheet applicable to various objects and uses as a light diffusing sheet and a light-guiding sheet suitable for an illuminator cover, a lighting window, a building material, a traffic sign, a sign board, a liquid crystal display device, etc., and an artistic design sheet having a deep appearance and/or a three-dimensional appearance, and an apparatus and a process for producing the resin sheet. Furthermore, the present invention relates to a surface light source element in which the resin sheet is used as a light guide, and a laminate in which such resin sheets are stacked.

BACKGROUND ART

Transparent resin sheets having a surface unevenness formed by a mold, transparent resin sheets coated with a light-diffusing agent or light-scattering agent on the back surface, and similar resin sheets, have been known as light diffusible resin sheets.

Transparent resin sheets subjected to shading printing, shadow printing, or the like printing, and transparent resin sheets having an unevenness in the interior have been known as artistic design sheets.

Japanese Examined Utility Model Publication (Kokoku) No. 7-36742 discloses a luminous decorative sheet prepared by successively laminating a transparent resin layer, a transparent embossed resin layer and a light reflective layer. However, the light reflective layer is laminated to the portion having an uneven pattern in the transparent embossed resin layer. As a result, the sheet is not suited to a light guide which is used by making light incident on the back surface or side of the sheet.

Japanese Unexamined Patent Publication (Kokai) No. 3-256735 discloses a cut-glass-like sheet which is a composite sheet prepared by forming V-shaped grooves on one side of a polyvinyl chloride sheet, and bonding a polyvinyl chloride sheet having a smooth surface to the V-shaped groove-formed surface and which has a closed air layer in the V-shaped groove portion. However, since such a sheet having a structure with an inner air layer shows a large difference in refractive indexes between the resin layer and the air layer, the light divisibility becomes too large. The sheet is, therefore, not suitable for a light guide.

On the other hand, as an instance of a back surface light source device used for a liquid crystal display device, a sign board, a traffic sign, etc., there is an edge-lit-type back surface light source device in which a linear light source is arranged on an end surface of a plate-like light guide. Such an edge-lit-type back surface light source device is one wherein a plate-like transparent material such as an acrylic resin plate is used as a light guide, light from a light source arranged on one side end thereof is made incident thereon, and light is allowed to exit in a plane form from the surface (light-exiting surface) thereof. The light guide used herein usually has a light-scattering portion and/or light-diffusing portion formed on the surface or on the back surface. Such a surface light source element is required to ensure the uniformity of the luminance of the exiting light regardless of the distance from the light source. The performance is particularly important to a large size surface light source element.

Japanese Unexamined Patent Publication (Kokai) No. 5-127159 discloses a surface light source element having a light guide the surface of which is printed with a light-diffusing material such as titanium white in a dot form, and a prism sheet is placed on the light-exiting surface. uniform luminance can be obtained from such a surface light source element by changing the covering ratio of the dots according to a distance from the light source. However, the dot-like pattern must be shielded with a light diffusible sheet. Consequently, the luminance is lowered, and the structure of the surface light source element becomes complicated.

Japanese Unexamined Patent Publication (Kokai) No. 2-84618 discloses a surface light source element having a light guide with a satin surface at least on one of the surface (light-exiting surface) and the back surface, and a prism sheet placed on the light-exiting surface. Although a very high luminance can be obtained from such a surface light source element, the uniformity of the luminance of the exiting light is not satisfactory.

DISCLOSURE OF INVENTION

An object of the present invention is to provide a transparent resin sheet which can be used as a light guide, a light diffusible sheet, an artistic design sheet, etc.

Another object of the present invention is to provide an apparatus and a method capable of producing the resin sheet at low cost with high productivity.

A further object of the present invention is to provide a surface light source element in which the resin sheet is used as a light guide.

A still further object of the present invention is to provide a resin sheet laminate in which the resin sheets are laminated.

The above-mentioned objects of the present invention can be achieved by the present invention having the constitutions as described below.

1. A resin sheet having a laminate structure in which a transparent resin layer C is sandwiched between a transparent resin layer A and a transparent resin layer B, and having a smooth outer surface, any two adjacent resin layers of the three resin layers having refractive indexes which differ from each other, in a cross-section represented by an xy plane wherein y is a thickness direction of the resin sheet, and x is a width direction thereof, at least one of two interfaces formed between the resin layers A and C and between the resin layers B and C having an uneven shape.

2. A resin sheet having a laminate structure of a transparent resin layer A and a transparent resin layer B, and having a smooth outer surface, the adjacent resin layers having refractive indexes which differ from each other, in a cross-section represented by an xy plane wherein y is a thickness direction of the resin sheet, and x is a width direction thereof, an interface formed between the resin layers A and B having an uneven shape.

3. An apparatus for producing the resin sheet in 1 above which comprises a composite resin flow passage 21 having a predetermined width in the X direction, a predetermined thickness in the Y direction and a predetermined length in the Z direction, and comprising a composite flow formation portion 22 at one end in the Z direction, and a composite flow outlet 23 at the other end, a slit-like flow passage 31 extending in the X direction, for allowing a resin c for the resin layer C to flow toward the Z direction in the composite flow formation portion 22, and two flow passages 41, 42 for allowing a resin a for the resin layer A and a resin b for the resin layer B to flow into the composite flow formation portion 22 from both sides of an XZ plane including the flow passage 31 for the resin c, at least one of the XZ cross-sections of the flow passages 41, 42 for the respective resins a and b having a shape in which a portion or portions (Ln and/or Rn) having a large height in the Z direction and a portion or portions (Lm and/or Rm) having a small height (including zero) in the Z direction are alternately arranged.

4. An apparatus for producing the resin sheet in 2 above which comprises a composite resin flow passage 21 having a predetermined width in the X direction, a predetermined thickness in the Y direction and a predetermined length in the Z direction, and comprising a composite flow formation portion 22 at one end in the Z direction, and a composite flow outlet 23 at the other end, and two flow passages 41, 42 for allowing a resin a for the resin layer A and a resin b for the resin layer B to flow into the composite flow formation portion 22 from both sides of an XZ plane including the flow passage 21, at least one of XZ cross-sections of the flow passages 41, 42 for the respective resins a and b having a shape in which a portion or portions (Ln and/or Rn) having a large height in the Z direction and a portion or portions (Lm and/or Rm) having a small height (including zero) in the Z direction are alternately arranged.

5. A process for producing a resin sheet with the apparatus in 3 above comprising allowing the resin c for the transparent resin layer C to flow into the composite flow formation portion 22 through the slit-like flow passage 31, allowing, on the other hand, the resin a for the transparent resin layer A and the resin b for the transparent reins layer B to flow into the composite flow formation portion 22 through the two respective flow passages 41, 42 so that a cross-sectional shape of a molten resin layer formed from the resin c is deformed by flow action of the resins a and b, and taking off a resin sheet flowing out from the composite flow outlet 23.

6. A process for producing a resin sheet with the apparatus in 4 above comprising allowing the resin a for the transparent resin layer A and the resin b for the transparent resin layer B to flow into the composite flow formation portion 22 through the two respective flow passages 41, 42 so that a cross-sectional shape of a bonded portion of the resins a and b is deformed by flow action of the resins a and b, and taking off a resin sheet flowing out from the composite flow outlet 23.

7. A surface light source element comprising the resin sheets in 1 or 2 above as a light guide 51, a reflective material 52 arranged on the back surface of the light guide, a light source 53 placed on at least one end surface (yz plane) in the x direction of the light guide, and a light-deflecting sheet 54 placed on a surface thereof and having a function of changing the direction of the light which is allowed to exit from the surface thereof to the normal direction thereof.

8. A resin sheet laminate comprising at least two resin sheets in 1 or 2 above, the x directions of any two adjacent resin sheets being deviated from each other at a predetermined angle.

BRIEF DESCRIPTION OF DRAWINGS

FIG. 18 is a schematic plan cross-sectional view showing another embodiment of the construction of the apparatus according to the present invention.

BEST MODE FOR CARRYING OUT THE INVENTION

The apparatus for producing a resin sheet, the process for producing the same, the resin sheet, the surface light source element and the resin sheet laminate according to the present invention will be successively explained hereinafter.

Figure 2:
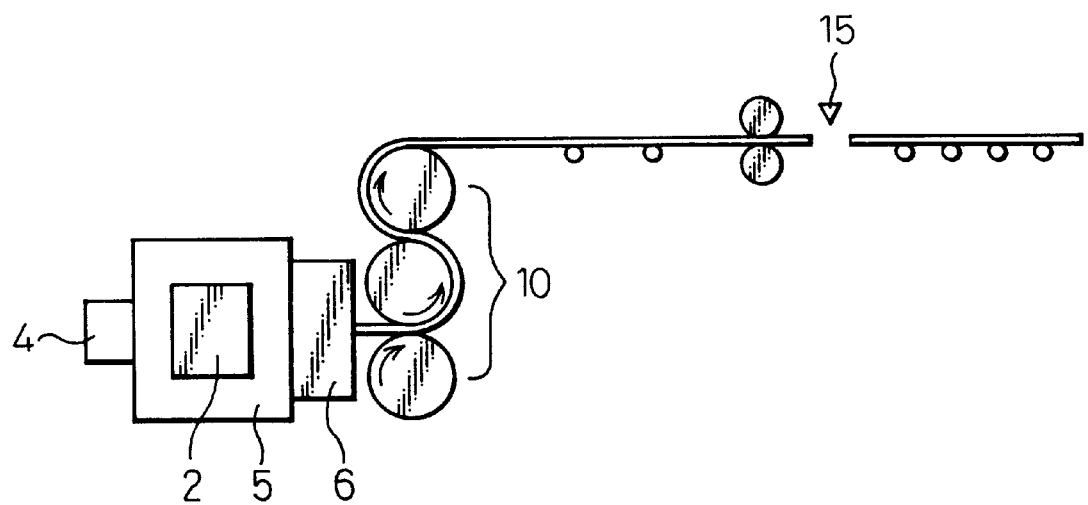
FIG. 2 is a schematic side view of the apparatus in FIG. 1.

In the apparatus (apparatus disclosed in claim 7) according to a first aspect of the present invention, the X, Y and Z directions agree with the width direction, the thickness direction and the running direction of the resin sheet, respectively. The Z direction may be made to agree with the vertical direction as shown in FIG. 4, or with the horizontal direction as shown in FIG. 2.

Figure 4:
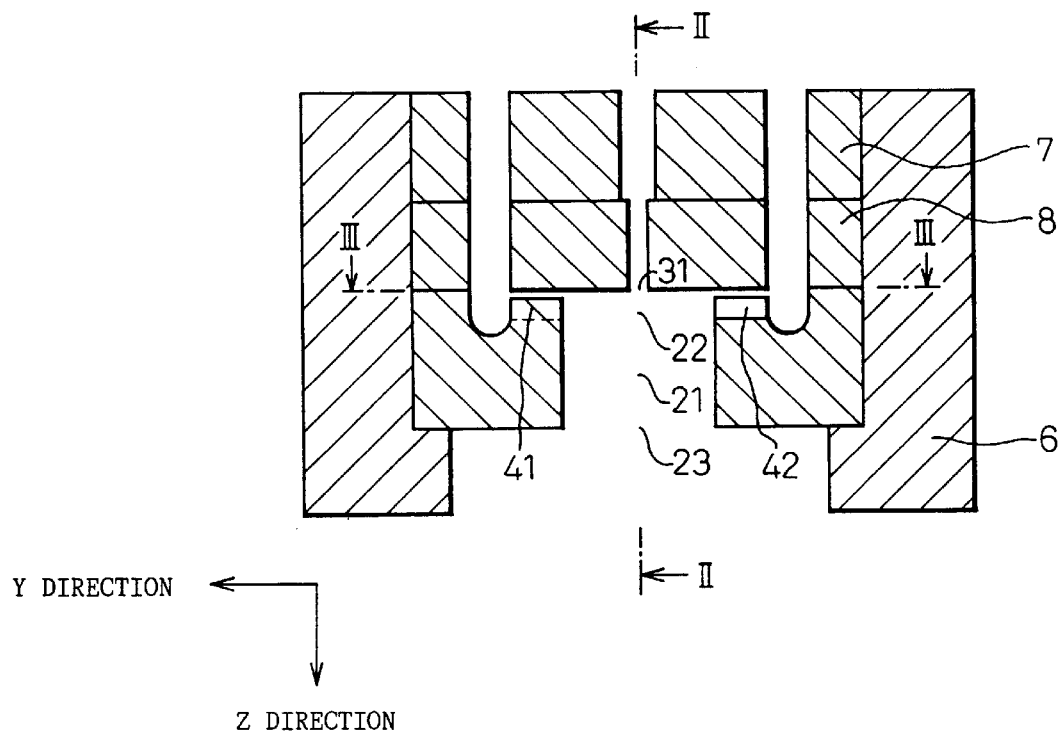
FIG. 4 is a fragmentary cross-sectional view along the line I—I in FIG. 3.
Figure 6:
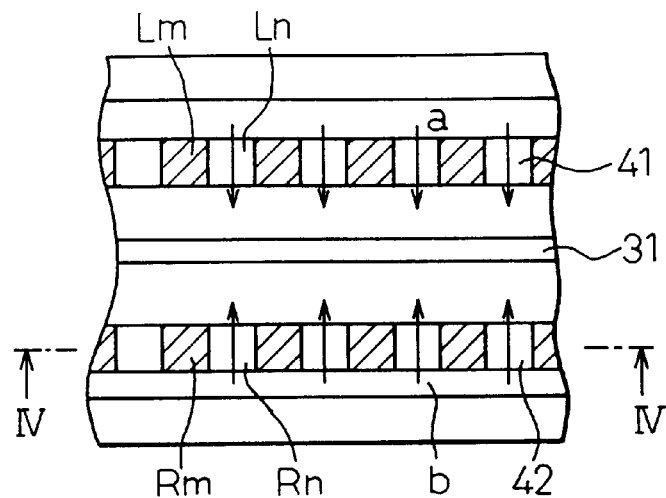
FIG. 6 is a schematic cross-sectional view for illustrating an embodiment of resin flow passages in the apparatus in FIG. 1.

The significant features of the apparatus according to the first aspect of the present invention are the shape and arrangement of the two flow passages 41 and/or 42 for allowing the resin a for the resin layer A and the resin b for the resin layer B to flow into the composite flow formation portion 22 (FIG. 4). That is, the shapes of the flow passages 41 and/or 42 in the XZ cross-section are characterized in that a portion or portions Rn and/or Ln each having a large height in the Z direction and a portion or portions Rm and/or Lm each having a small height (cases where the heights are 0 being allowed) are alternately arranged (FIG. 6).

Figure 1:
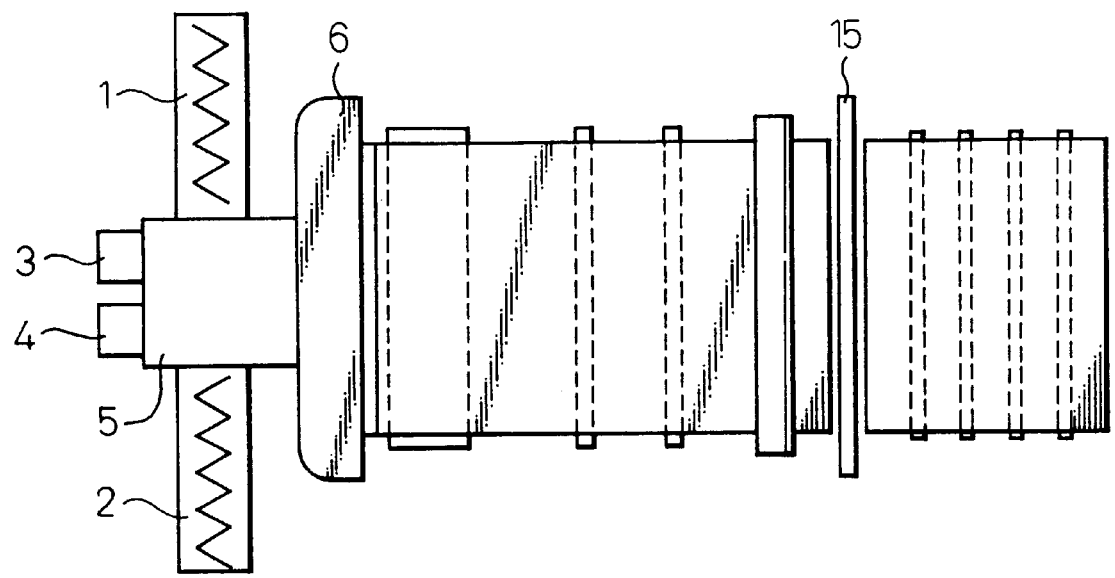
FIG. 1 is a schematic plan view of an embodiment of the apparatus according to a first aspect of the present invention.
Figure 3:
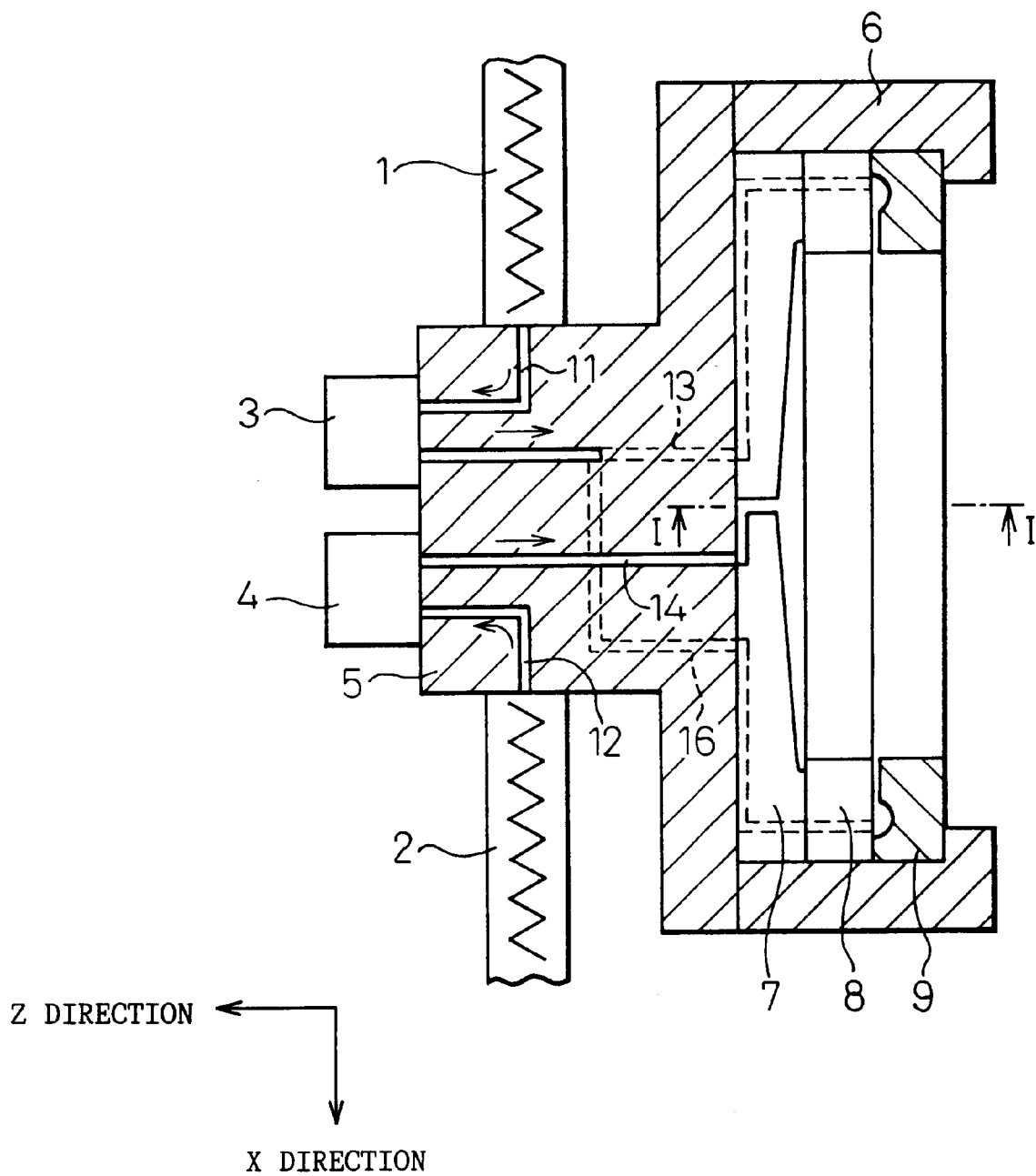
FIG. 3 is a schematic plan cross-sectional view schematically showing an embodiment of the internal structure of the apparatus in FIG. 1.

FIG. 1 shows an apparatus employed when the resin a for forming the resin layer A is the same as the resin b for forming the resin layer B. The resin is termed a resin a (or b). The resin a (or b) is melted and extruded by a first extruder 1 into a molding head and reaches a first volume regulating pump 3 through a first flow passage 11. The resin c for forming the resin layer C is melted and extruded by a second extruder 2 into the same molding head and reaches a second volume-regulating pump 4 through a second flow passage 12. The resin a (or b) is distributed to two flow passages 13, 16 arranged on the left and right sides, respectively through a distributing nozzle provided within a die pack 5, to form resin flows of the resin a and the resin b (FIG. 3). Moreover, the resin c is introduced into the flow passage 31 by the distribution nozzle through a flow passage 14 provided within the die pack 5 (FIG. 4).

In addition, when the resin a differs from the resin b, one of the two resins is supplied by a third extruder (not shown).

The resin c is discharged into the composite flow formation portion 22 from the slit-like flow passage 31 to form a sheet-like flow having a predetermined thickness (FIG. 4). On the other hand, the resins a and b are allowed to flow so that the resin c, discharged into the composite flow formation portion 22, is sandwiched therebetween to form a composite resin flow. The composite resin is extruded from the composite flow outlet 23, and taken off by cooling rolls 10 to have a sheet-like form. The sheet-like material is cut in predetermined lengths by a sheet cutter 15 (FIGS. 1, 2). In addition, when the composite resin is to be shaped into a thin film-like material, the discharged resin is coiled by a coiler after passing through cooling rolls.

In the composite flow formation portion 22, the resins a and b exert action on the resin c depending on the relative arrangement of the flow passages 41, 42 and the flow passage 31, and the resin c is consequently deformed to have a desired cross-sectional shape in the XY cross-section.

The apparatus and the process for producing the resin sheet of the present invention will be explained below with reference to the drawings.

FIGS. 1 to 4 are schematic views showing one embodiment of the apparatus according to the first aspect of the present invention. FIGS. 1 and 2 are a schematic plan view and a schematic side view of the entire apparatus, respectively. FIGS. 3 and 4 are a plan cross-sectional view and a vertical cross-sectional view, respectively showing an embodiment of the inner structure of the apparatus.

Figure 5:
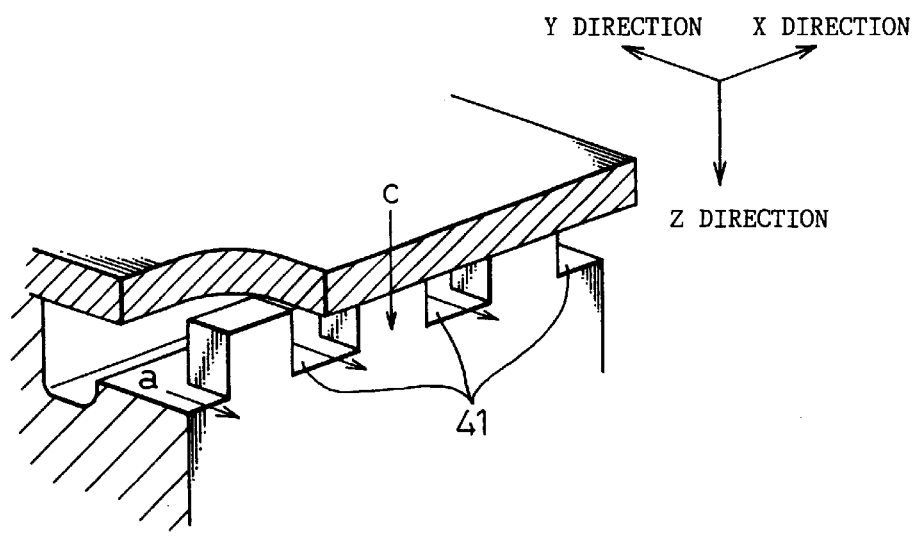
FIG. 5 is a perspective view from the direction of the line II—II in FIG. 4.

FIG. 5 is a perspective view from the direction of the line II—II in FIG. 4.

Figure 7:
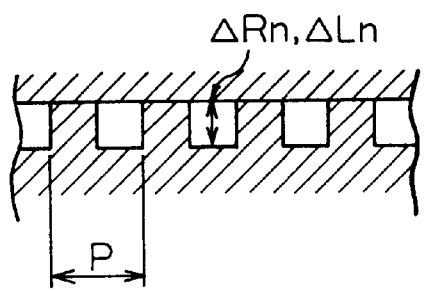
FIG. 7 is a fragmentary cross-sectional view along the line IV—IV in FIG. 6.

FIGS. 6 and 7 show resin flow passages in a production apparatus which is a typical embodiment of the present invention. FIG. 6 is a fragmentary cross-sectional view along the line III—III shown in FIG. 4.

FIG. 7 is a fragmentary cross-sectional view along the line IV—IV in FIG. 6.

In the apparatus, the flow passage 31 has an outlet having a constant spacing from one end in the X direction of the composite flow formation portion 22 to the other end.

Portions Ln, Lm of the flow passages 41 and portions Rn, Rm of the flow passages 42 are symmetrically arranged with respect to the XZ plane including the flow passage 31. The width of the portions Ln and that of the portions Rn in the X direction are equal, and the width of the portions Lm and that of the portions Rm are also equal. The height ΔLn and the height ΔRn in the Z direction are equal, and the height ΔLm and the height ΔRm are also equal. The widths and heights of the portions Ln, Lm and the portions Rn, Rm may be suitably varied from one apparatus to another one, or within the same apparatus. The flow amounts and flow rates of the resins a and b are determined by the widths and heights of these flow passages.

Figure 8:
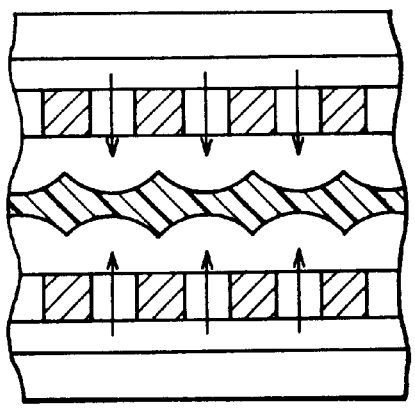
FIG. 8 is a schematic view showing the cross-sectional shape of the resin layers formed in the composite resin flow passage shown in FIG. 6.
Figure 30A:
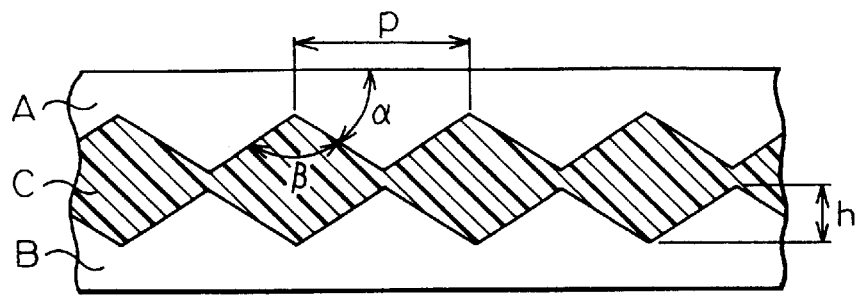
FIGS. 30a to 30k are cross-sectional views each showing another embodiment of the structure of a resin sheet obtained by the apparatus of the present invention.

FIG. 8 shows the cross-sectional shape of the resin layer at the downstream site of the composite resin flow passage in FIG. 6. The resin c allowed to flow out from the flow passage 31 in a flat plate form is deformed by the flow action exerted by the resins a and b shown by arrows in FIG. 6. As a result, the cross-sectional shape of the resin layer C comes to have a structure in which lens-shaped blocks are connected as shown in FIG. 8 and FIG. 30a. In addition, in FIG. 8, in order to easily understand the relationship between the shapes of the flow passages 41, 42 and the cross-sectional shape of the resin sheet finally produced, the flow passages 41, 42 situated upstream compared with the position of the figure are also shown in the same figure, for convenience.

Figure 9:
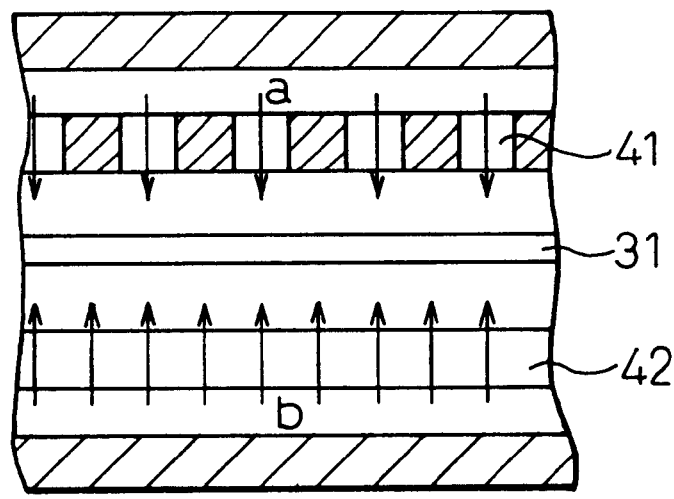
FIG. 9 is a schematic cross-sectional view for illustrating another embodiment of resin flow passages in the apparatus in FIG. 1.
Figure 10:
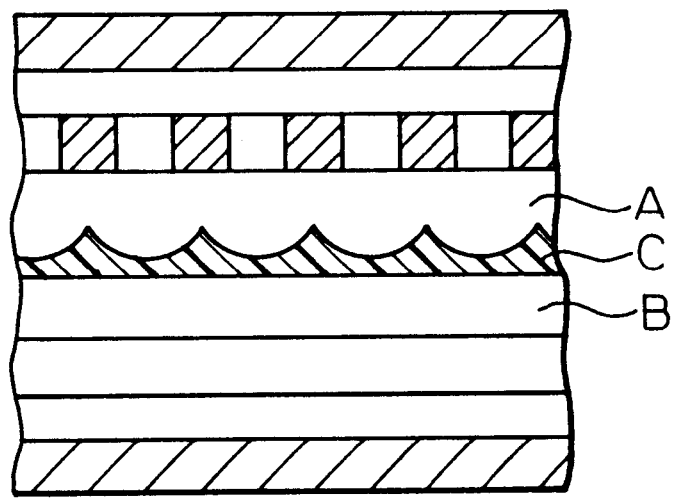
FIG. 10 is a schematic view showing the cross-sectional shape of the resin layers formed in the composite resin flow passage in FIG. 9.

FIGS. 9 and 10 are schematic views showing another embodiment of the apparatus according to the first aspect of the present invention. FIG. 9 is a fragmentary cross-sectional view along the line III—III in FIG. 4. FIG. 9 shows an apparatus in which the portions Ln, Lm are formed in the flow passages 41, and in which neither the portions Rn nor the portions Rm is formed in the other flow passages 42. The cross-sectional shape of the flow passages 41 is the same as in FIG. 7. FIG. 10 is a synthetic figure represented in the same manner as in FIG. 8.

Figure 29A:
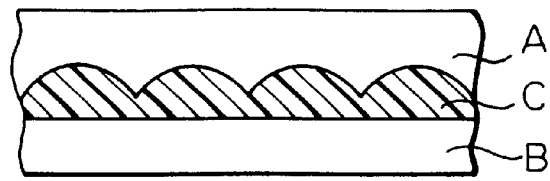
FIGS. 29a to 29i are cross-sectional views each showing another embodiment of the structure of a resin sheet obtained by the apparatus of the present invention.
Figure 29B:
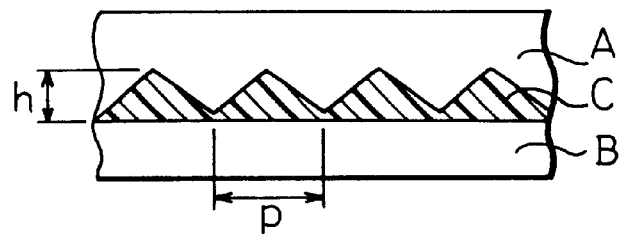
Figure 29C:
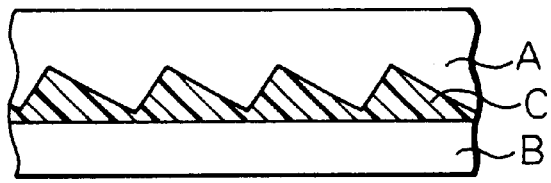
Figure 29D:
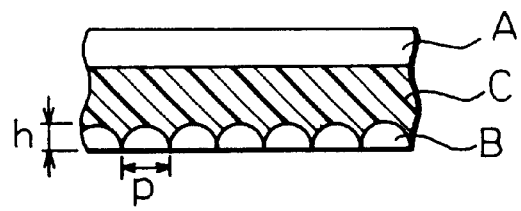
Figure 29E:
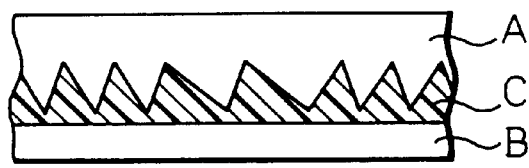

When such an apparatus is used, a resin sheet, having uneven depressions and protrusions on the side of the interface between the resin layer A and the resin layer C as shown in FIGS. 10 and 29b, is produced.

Figure 11:
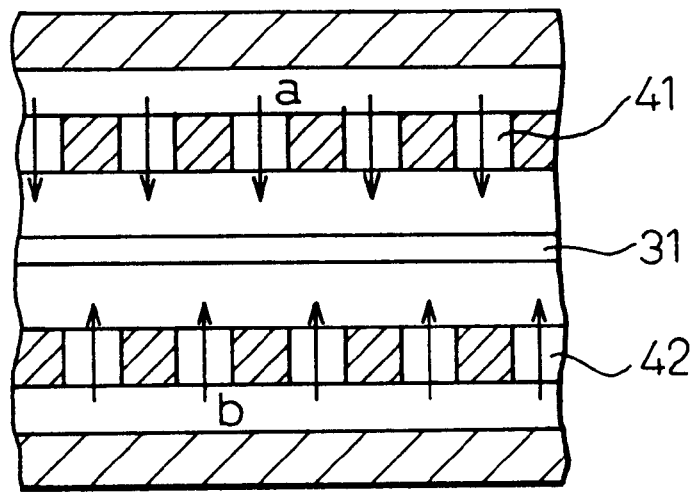
FIG. 11 is a schematic cross-sectional view for illustrating still another embodiment of resin flow passages in the apparatus in FIG. 1.
Figure 12:
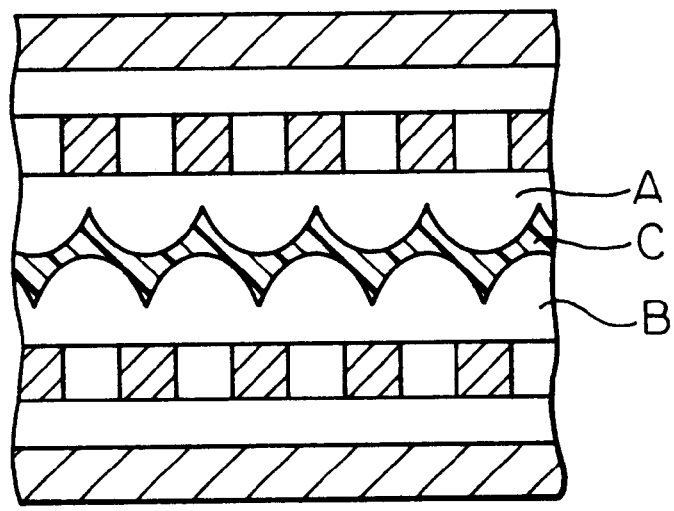
FIG. 12 is a schematic view showing the cross-sectional shape of the resin layers formed in the composite resin flow passage in FIG. 11.

FIGS. 11 and 12 are schematic views showing another embodiment of the apparatus according to the first aspect of the present invention. FIG. 11 is a fragmentary cross-sectional view along the line III—III in FIG. 4. In the apparatus in FIG. 11, the portions Ln of the flow passages 41 and the portions Rm of the flow passages 42 are symmetrically arranged with respect to the XZ plane including the flow passage 31, and the portions Lm of the flow passages 41 and the portions Rn of the flow passages 42 are symmetrically arranged with respect thereto. The cross-sectional shapes of the flow passages 41, 42 are the same as in FIG. 7. FIG. 12 is a synthetic figure represented in the same manner as in FIG. 8.

Figure 30B:
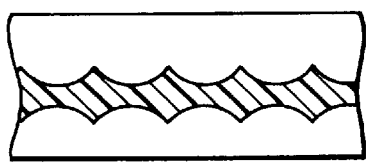
Figure 30F:
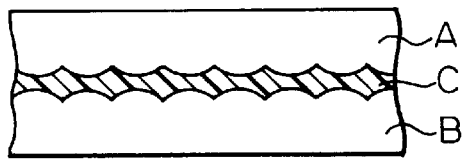
Figure 30C:
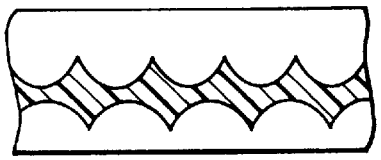
Figure 30G:
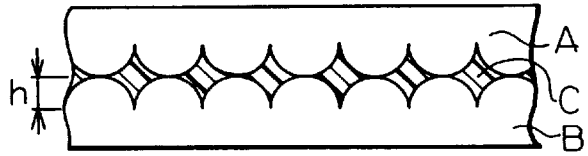
Figure 30D:
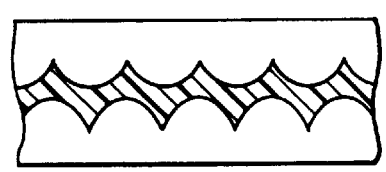

When the apparatus is used, a resin sheet as shown in FIG. 12 or FIG. 30d is produced.

Figure 13:
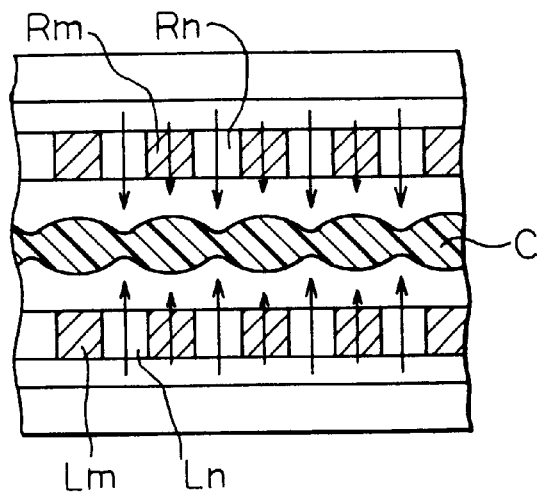
FIG. 13 is a schematic cross-sectional view showing another embodiment of the cross-sectional shape of the resin layers formed in the composite resin flow passage in the apparatus in FIG. 1.
Figure 14:
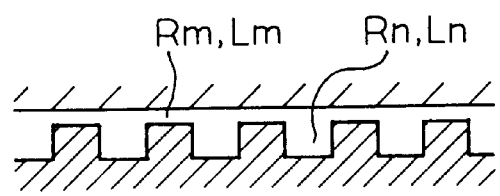
FIG. 14 is a schematic cross-sectional view showing the shape of the resin flow passages in FIG. 13.

The arrangement of the portions Ln, etc. of the flow passages 41, 42 in FIG. 13 is the same as in FIG. 6, and FIG. 13 shows an apparatus having a structure in which small amounts of the resins a and b can flow through the portions Lm, Rm each having a small flow passage height as shown in FIG. 14. FIG. 13 is also a synthetic view represented in the same manner as in FIG. 8.

When the apparatus is employed, a resin sheet as shown in FIG. 13 or FIG. 30b is produced.

Figure 15:
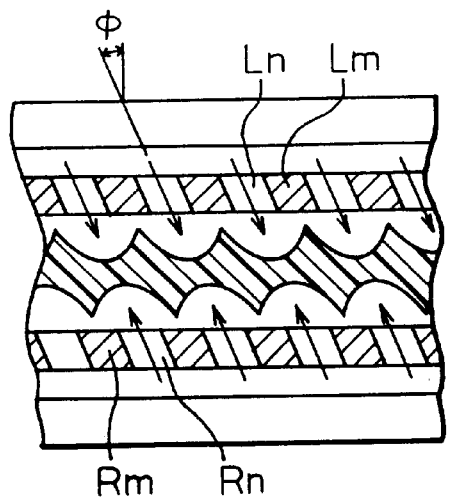
FIG. 15 is a schematic cross-sectional view showing still another embodiment of the cross-sectional shape of the resin layers formed in the composite resin flow passage in the apparatus in FIG. 1.
Figure 16A:
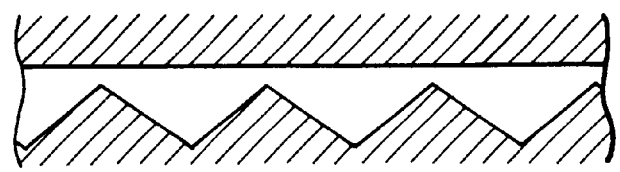
FIGS. 16*a* to 16*f* are schematic cross-sectional views each showing another embodiment of the resin flow passages as shown in FIG. 14.
Figure 16B:
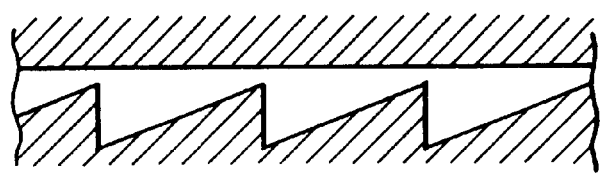
Figure 16C:
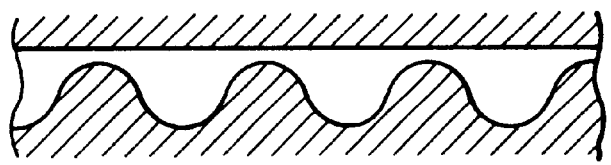
Figure 16D:
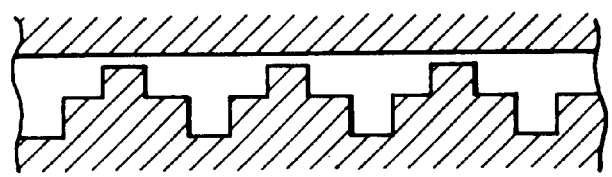
Figure 16E:
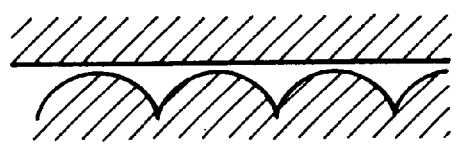
Figure 16F:
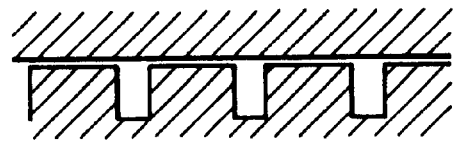

FIG. 15 shows an apparatus in which the flow passages 41,in FIG. 6 are tilted at a predetermined angle of φ to the YZ plane. FIG. 15 is also a synthetic view represented in the same manner as in FIG. 8. A resin sheet as shown in FIG. 15 or FIG. 30c is produced by the use of the apparatus.

Typical embodiments of the apparatus according to the first aspect of the present invention have been explained above. As the shapes of the flow passages 41, 42 corresponding to FIG. 7 and FIG. 14, various shapes as shown in FIGS. 16a to 16f can be adopted. The pitch p and the height h of the uneven shape of these depressions and protrusions are suitably varied.

Figure 17:
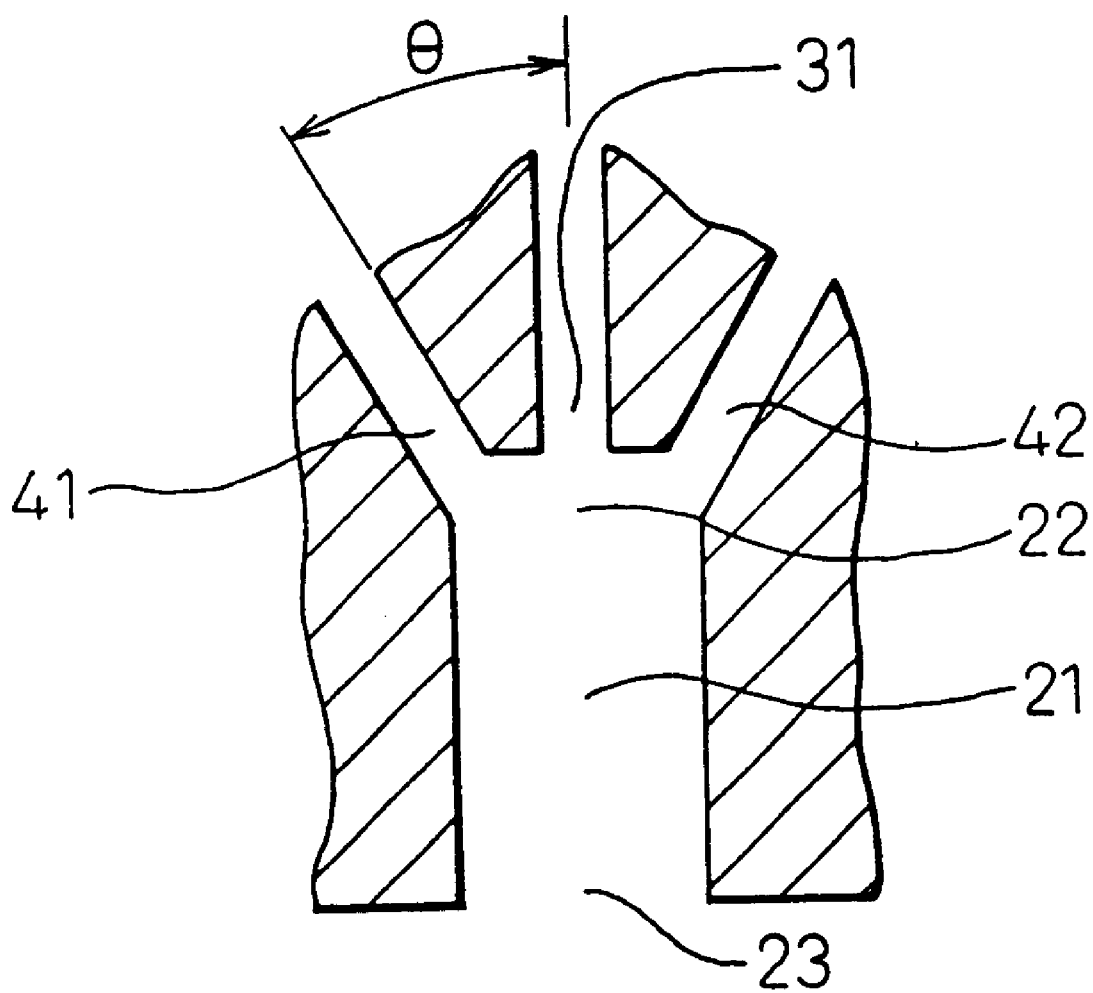
FIG. 17 is a schematic cross-sectional view showing still another embodiment of the resin flow passages in the apparatus in FIG. 1.

Moreover, as shown in FIG. 17, the flow passages 41, 42 flowing toward the composite flow formation portion 22 can also be tilted at a predetermined angle of θ to the XZ plane.

Figure 19A:
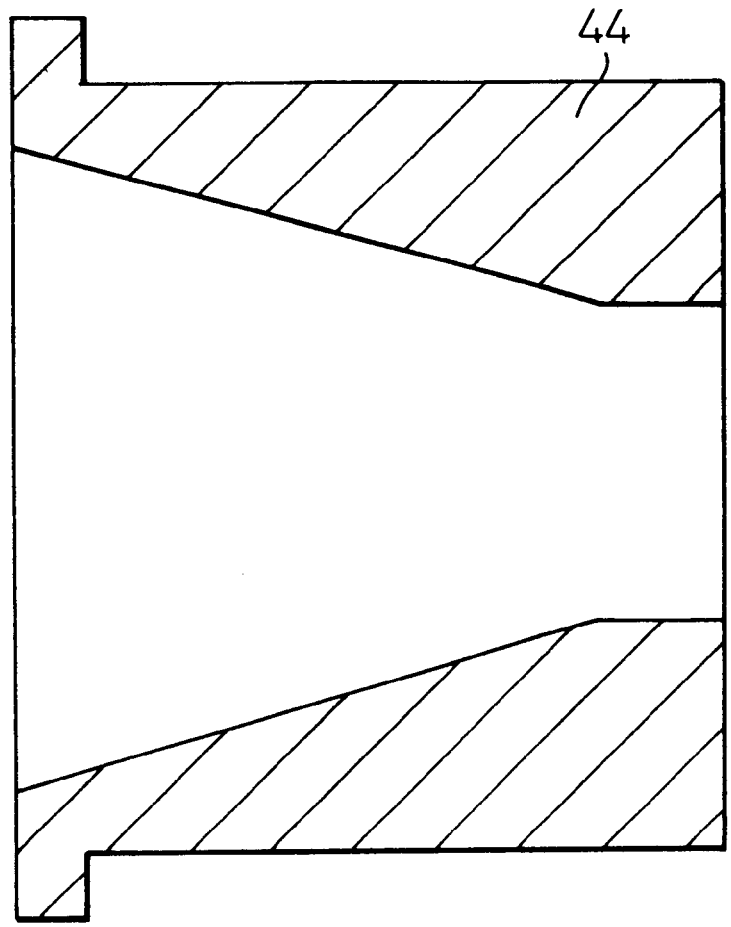
FIG. 19*a* is a schematic plan cross-sectional view showing the die portion of the apparatus in FIG. 18.
Figure 19B:
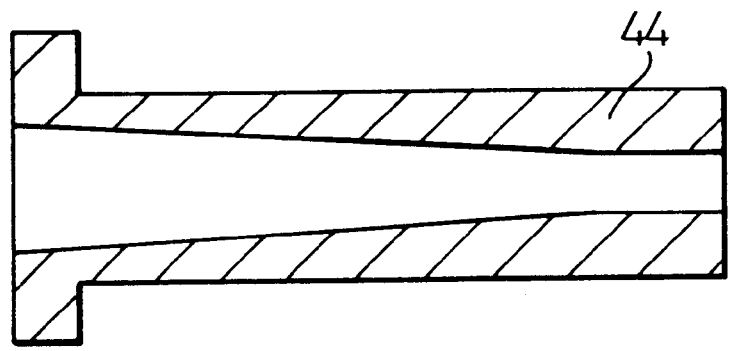
FIG. 19*b* is a corresponding side cross-sectional view of the die portion in FIG. 19*a*.

The outlet of the flow passage 21 can have various structures in accordance with the object. For example, as shown in FIG. 18 and FIGS. 19a and 19b, the spacing of the cross-section of a flow passage (XY cross-section) in the X direction and the spacing thereof in the Y direction can be narrowed toward the flow passage outlet 45 by attaching a die 44. Use of such a structure promotes the forming the uneven shape of depressions and protrusions at the interface of the resins.

Furthermore, the outlet of the flow passage 31 can also be offset from the central position between the flow passages 41, 42 shown in FIG. 4 to one of them.

Figure 20:
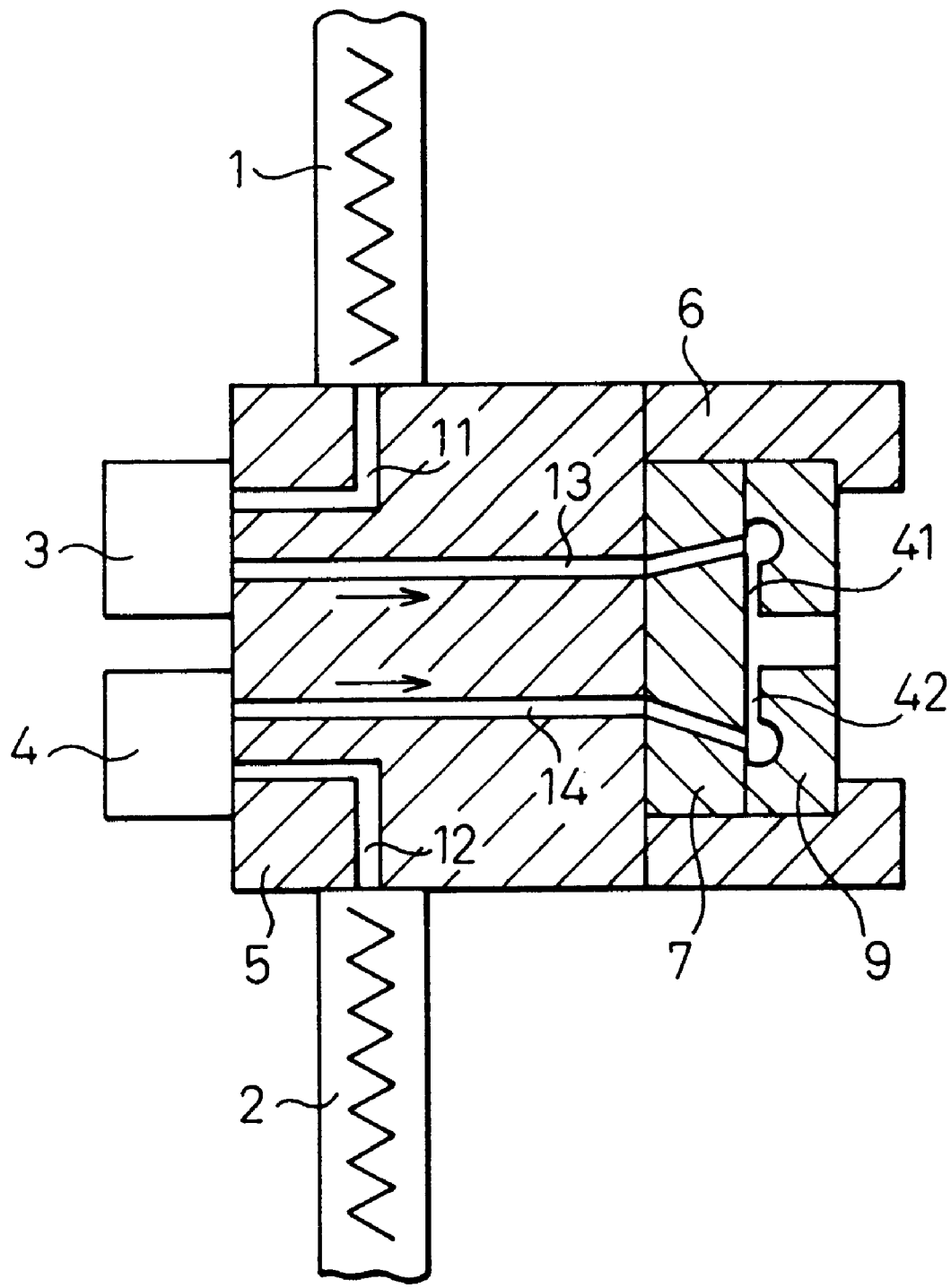
FIG. 20 is a schematic plan cross-sectional view showing an embodiment of the internal structure of the apparatus according to a second aspect of the present invention.

FIG. 20 is a schematic plan cross-sectional view showing an embodiment of the internal structure of the apparatus according to a second aspect of the present invention. The apparatus differs from the apparatus (FIG. 3) according to the first aspect of the present invention in that it has no flow passage for the resin c. The apparatus is fundamentally the same as the apparatus according to the first aspect of the invention except for the aspect mentioned above.

That is, the apparatus has the same composite resin flow passage 21 and the same flow passages 41, 42 as in the apparatus according to the first aspect of the invention. The arrangement, the sizes and the shapes of the portions Ln, Lm of the flow passages 41 and those of the portions Rn, Rm of the flow passages 42 can be employed variously in the same manner as in the apparatus according to the first aspect of the invention.

Figure 21:
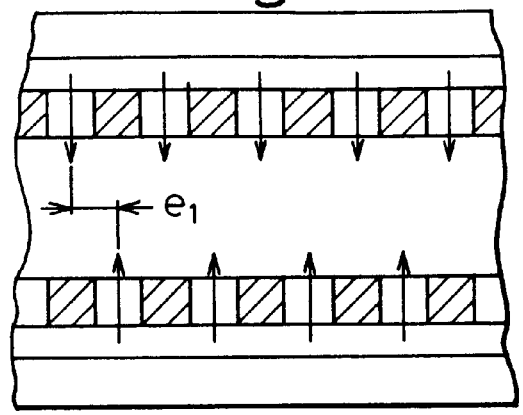
FIG. 21 is a schematic cross-sectional view showing an embodiment of the resin flow passages in the apparatus in FIG. 20.
Figure 22:
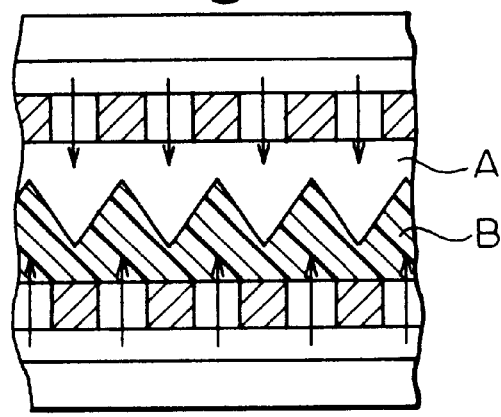
FIG. 22 is a schematic view showing the cross-sectional shape of the resin layers formed in the composite resin flow passage in FIG. 21.

In the apparatus in FIG. 21, the portions Ln of the flow passages 41 and the portions Rm of the flow passages 42 are symmetrically arranged with respect to the XZ plane passing through the central portion of the composite flow formation portion 22, and the portions Lm of the flow passages 41 and the portions Rn of the flow passages 41 are symmetrically arranged with respect to the same XZ plane. The cross-sectional shapes of flow passages 41, 42 are the same as those in FIG. 7. When the apparatus is used, a resin sheet having the interface of both resin layers in a polygonal line form in the XY cross-section is produced, as shown in FIG. 22. In addition, FIG. 22 is a synthetic view represented in the same manner as in FIG. 8.

Figure 23:
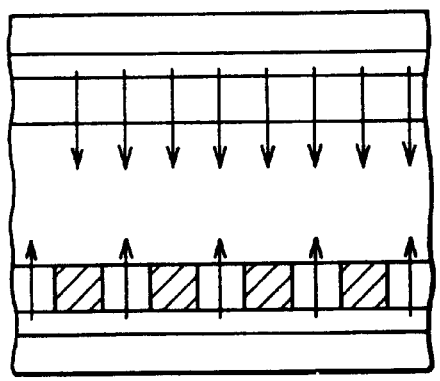
FIG. 23 is a schematic cross-sectional view showing another embodiment of the resin flow passages in the apparatus in FIG. 20.
Figure 24:
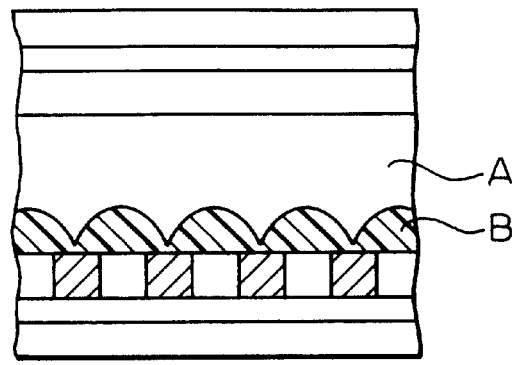
FIG. 24 is a schematic view showing the cross-sectional shape of the resin layers formed in the composite resin flow passage in FIG. 23.
Figure 31A:
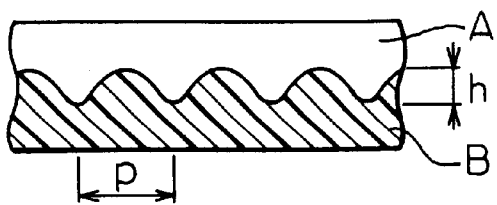
FIGS. 31a to 31h are cross-sectional views each showing another embodiment of the structure of a resin sheet obtained by the apparatus of the present invention.
Figure 31B:
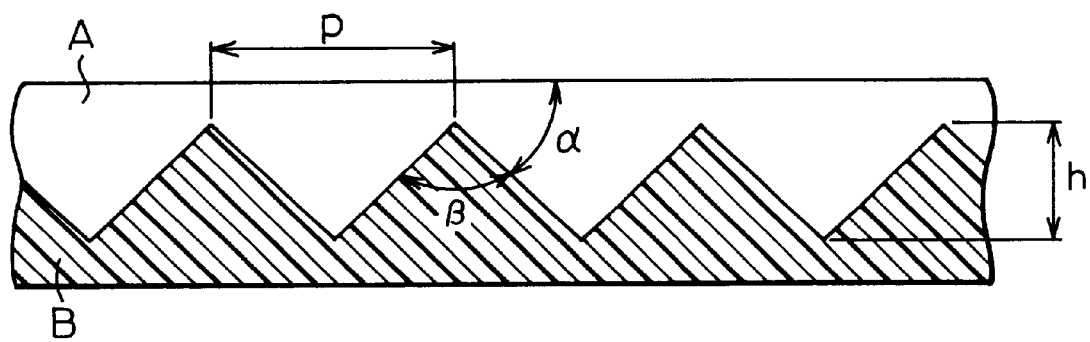
Figure 31C:
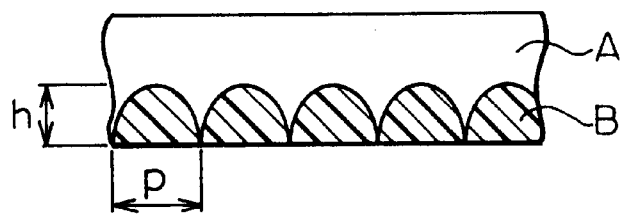
Figure 31D:

When an apparatus, wherein the portions Rn, Rm are formed in the flow passages 42 and a flow passage having a constant height is formed over the entire flow passage 41 in the x direction as shown in FIG. 23, is used a resin sheet in which the interface is offset to the rein layer B as shown in FIG. 24 or 31c is produced. FIG. 24 is a synthetic view represented in the same manner as in FIG. 8.

Figure 25:
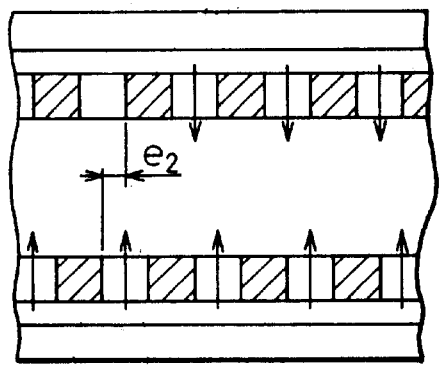
FIG. 25 is a schematic cross-sectional view showing another embodiment of the resin flow passages in the apparatus in FIG. 20.
Figure 26:
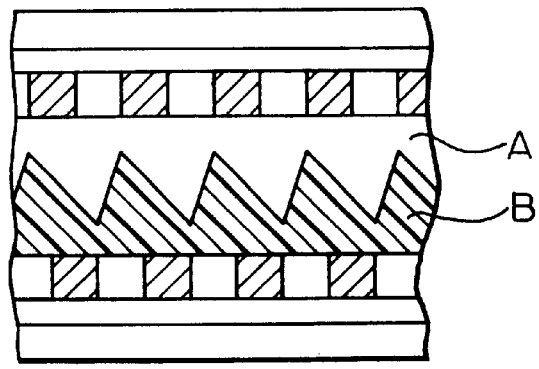
FIG. 26 is a schematic view showing the cross-sectional shape of the resin layers formed in the composite resin flow passage in FIG. 25.
Figure 31E:
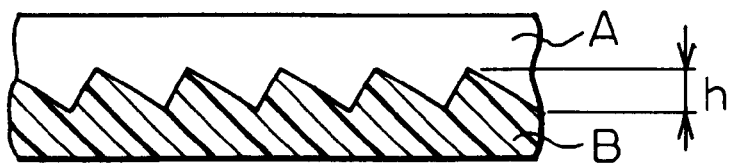
Figure 31F:
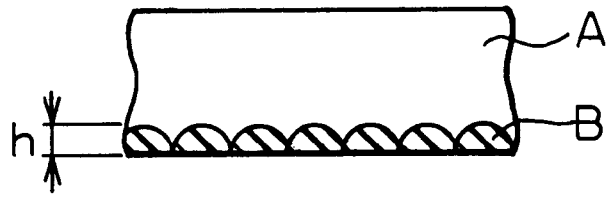
Figure 31G:
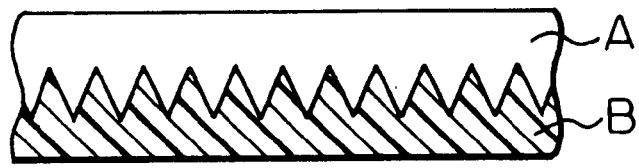

The apparatus in FIG. 25 is one in which the positional relationship between the portions Ln of the flow passages 41 and the portions Rn of the flow passages 42 is shifted to some degree compared with the relationship in the apparatus in FIG. 21. A resin sheet as shown in FIG. 26 or FIG. 31e is produced when the apparatus is used. FIG. 26 is a synthetic view represented in the same manner as in FIG. 8.

Figure 27:
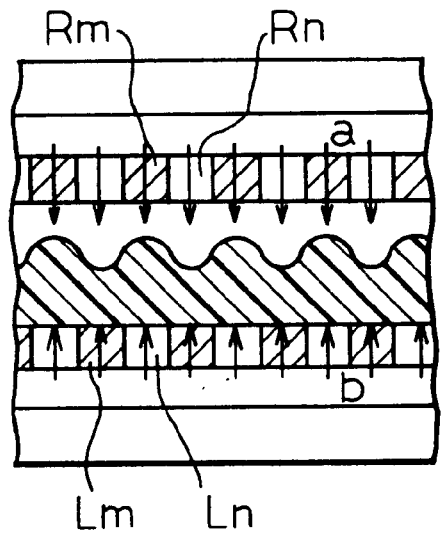
FIG. 27 is a schematic view showing the cross-sectional shape of the resin layers formed in the composite resin flow passage when resin flow passages having another shape is used in FIG. 21.

When the cross-sectional shapes of the flow passages 41, 42 in the apparatus of FIG. 21 are altered to those shown in FIG. 14, the resins a and b flow through the portions Rm, Lm each having a small passage height, in small amounts. Consequently, a resin sheet as shown in FIG. 27 or FIG. 31a is produced. FIG. 27 is a synthetic view represented in the same manner as in FIG. 8.

Figure 28:
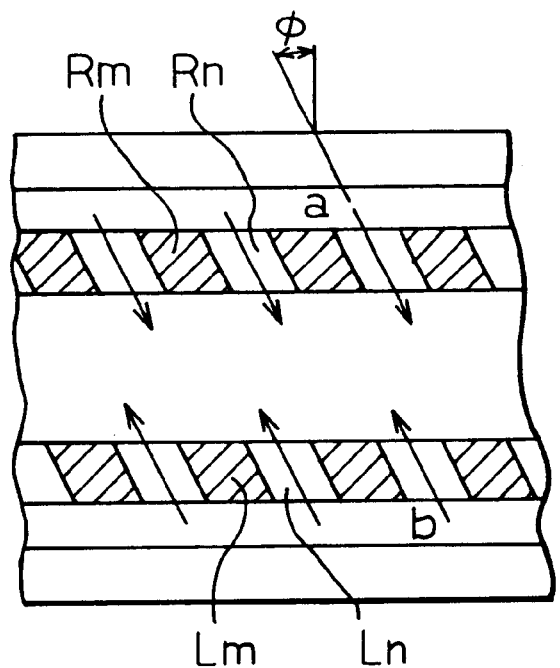
FIG. 28 is a schematic cross-sectional view showing still another embodiment of the resin flow passages in the apparatus in FIG. 1.

The directions of the flow passages 41, 42 can be tilted at a predetermined angle φ with respect to the YZ plane as shown in FIG. 28, in the same manner as in FIG. 15. As a result, a resin sheet as shown in FIG. 31e is similarly obtained.

Furthermore, the flow passages 41, 42 flowing toward the composite flow formation portion 22 can be tilted at a predetermined angle of θ to the XZ plane in the same manner as in FIG. 17.

A wide range of thermoplastic resins may be used as the resins in the present invention. There is no specific limitation on the resins a, b and c for the resin layers A, B and C so long as the resins are transparent. Examples of the resins include polyethylene terephthalate, polyvinyl chloride, polystyrene, polycarbonate, various acrylic resins represented by polymethyl methacrylate, amorphous polyolefins, polyamides, polymethylpentene, copolymer or blend resins of these polymers, acrylonitrile/styrene copolymer and methyl methacrylate/styrene copolymer. When transparency, weathering resistance, etc. are specifically required, acrylic resins are preferred, and polymethyl methacrylate is particularly preferred.

The combination of the resins a, b and c are suitably selected in accordance with the object. When the light divisibility is to be imparted to the resin sheet, a difference in the refractive indexes must be considered. Since adhesion among the resins influences the productivity of the resin sheet, the adhesion thereamong must be considered. Moreover, it is also important to select a combination of resins, to be laminated, in which the melting points of which differ little.

In order to prevent warping of the resin sheet, it is preferred that the resin sheet have a three-layered structure of the resin layers A, C and B, and that the physical properties of the resins a and b for the respective resin layers A and B be the same or similar to each other, particularly the resins a and b should be of the same kind of resin or the same resin.

Furthermore, when artistic design and a deep appearance are to be imparted to the resin sheet or when optical properties are to be imparted thereto, each of the resin layers may be colored by allowing it to contain organic or inorganic dyes or pigments, or it may be allowed to contain a light-diffusing agent, etc.

As exemplified in FIGS. 29a to 29i, FIGS. 30a to 30k and FIGS. 31a to 31h, the shape of the depressions and protrusions at the interface between any of the two resin layers formed in the xy cross-section of the resin sheet may take a linear shape such as a polygonal line form and a sawtooth form, or a curved shape such as a semi-circular form, a semi-elliptical form, a wave form, a parabolic form of the n-th power and a parabolic form of the 1/n-th power.

When light divisibility is to be imparted to the resin sheet, the light divisibility can be adjusted by suitably selecting the angle α between the sheet surface and the interface having a shape of depressions and protrusions shown in FIGS. 30a and 31b in the xy cross-section of the resin sheet, and the h/p ratio. Moreover, the repeating pitch p of the depressions and protrusions, the thickness of the resin layer C or B (namely, v or t in the figure), the entire thickness of the sheet, etc. are suitably determined in accordance with the object of imparting functionality. Furthermore, the repeating pitch p of the depression and protrusion unit and the h/p ratio can be suitably changed within one resin sheet. However, from the standpoint of maintaining the uniformity of the light divisibility, it is preferred that the pitch p be the same within the sheet.

Since the shape of depressions and protrusions is formed within the resin sheet of the present invention, the shape thereof suffers no damage during use. Moreover, since the surface of the resin sheet is smooth, a decreased amount of dust, etc. adheres to the surface of the resin sheet compared with a resin sheet having depressions and protrusions on the surface.

Furthermore, the production apparatus of the present invention is capable of producing a resin sheet having the shape of depressions and protrusions therewithin by one step, and achieves the significant effect of producing the resin sheet at an extremely high rate.

Next, the surface light source element of the present invention will be explained.

Since the resin sheet of the present invention has an excellent light divisibility, it can be used as the light guide of a surface light source element.

The x, y and z directions of a resin sheet forming the surface light source of the surface light source element are also defined as the x, y and z directions of the surface light source element, respectively. Moreover, as to the light guide (resin sheet), the side to which a reflective material 52 is applied is termed a back surface (or lower surface) and the side to which a light-deflecting sheet 54 such as prisms is laminated is termed a surface (or upper surface) (FIG. 32) for convenience of explanation. Accordingly, the relation of upper and lower sides does not necessarily agree with the actual relation thereof at the time when the surface light source element is actually used.

Figure 32:
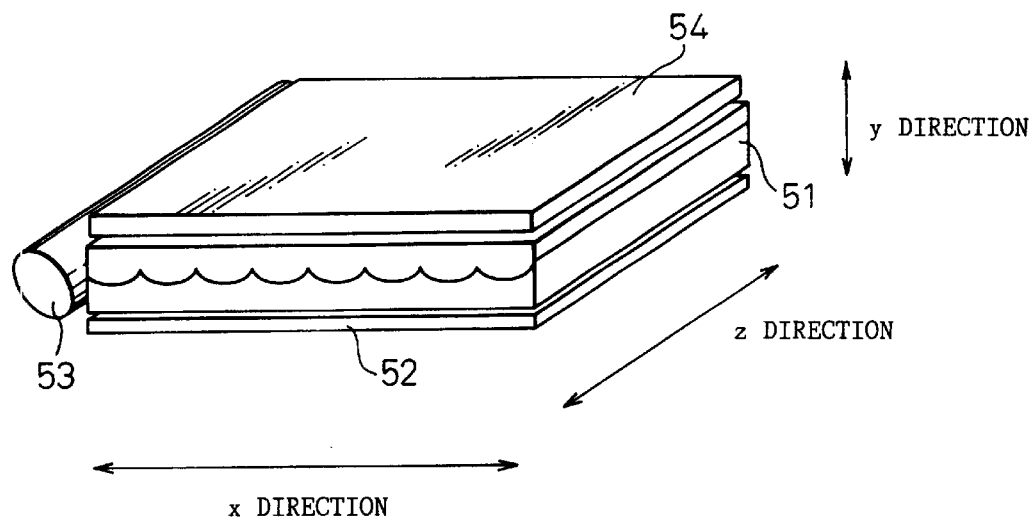
FIG. 32 is a schematic view showing an embodiment of a surface light source element of the present invention.

In the surface light source element of the present invention, a light source 53 is arranged at least on one end surface (yz plane) in the x direction of the light guide. In FIG. 32, the light source is placed on one end surface alone. A reflecting material is suitably applied to the other two or three end surfaces.

When a light guide is formed from at least two resin layers having refractive indexes different from each other and the interfaces among the resin layers have the shape of depressions and protrusions, light propagates through the light guide while being repeatedly reflected and refracted in accordance with Snell's law at the interfaces and the surfaces of the light guide. Of the light reaching the surface or back surface of the light guide, the portion of light exceeding the critical angle exits the light guide.

The present inventors have found that the relationship between the exiting intensity (I) of light at a point of the surface light source element and the exiting intensity ($I_0$) of light at the light-incident surface can be expressed experimentally by the formula (1)

$$I = I_0 (1 - \Phi/100)^{L'/t} \tag{1}$$

wherein Φ is a light-exiting ratio, L' is a distance from the light-incident end surface, and t is a thickness of the light guide.

It can be seen from formula (1) that the uniformity of the illuminance within the light-exiting surface is determined by the light-exiting ratio Φ when the length L and the thickness t of the light guide are determined.

In addition, the exiting ratio Φ of light in the light guide can be obtained by the following procedure: the luminance of the light is measured in the central zone in the z direction of the light guide at intervals of 20 mm from the light-incident end surface; the logarithmic value of the luminance is plotted against the ratio of a distance from the light-incident surface to the thickness (L'/t) (abscissa); the slope K of the resultant line is derived; and Φ is obtained form the formula (2)

$$\Phi = (1-10^k) \times 100 \tag{2}$$

The variation (R %) represented by the formula (3) mentioned below is used as a measure of the uniformity of the luminance distribution, and the uniformity of the luminance distribution in the surface light source element is evaluated. The variation (R %) can be obtained as described below. The luminance of the light guide is measured approximately in the central zone in the z direction thereof, initially at the point 15 mm apart from the light-incident end surface in the x direction and then at every point at spacings of 20 mm in the same direction to the end portion opposite to the light-incident end surface. The maximum value ($I_{max}$), the minimum value ($I^{min}$) and the average value ($I_{av}$) of the luminance are obtained from the measured luminances, and R % is determined from the formula (3)

$$R\% = \{(I_{max} - I_{min})/I_{av}\} \times 100 \tag{3}$$

As a result, the exiting ratio Φ and the variation R % are found to depend on the length L and the thickness t of the light guide and be in a specific relation; the variation R % increases with the exiting ratio Φ, and the variation R % increases with the ratio (L/t) of a length L to a thickness t of the light guide when the exiting ratio is constant. That is, it is understood that in a light guide having a certain magnitude, the uniformity (variation) of the luminance distribution within the light-exiting surface of the light guide depends on the exiting ratio Φ from the light guide, and that the uniformity of the luminance distribution can be maintained by controlling the exiting ratio Φ of the light.

On the other hand, the surface light source element is required to produce light which is incident on the light-incident end surface exit from the light-exiting surface with good efficiency. Accordingly, the exiting ratio of light (Φ) of the light guide must be at least a certain value, because the amount of light repeatedly undergoing round trip propagation increases, without exiting from the light-exiting surface, when the exiting ratio of light is too low. That is, the exiting ratio of light (Φ) of the light guide must be set at the optimum value corresponding to the size of the light guide while both the uniformity of the luminance distribution in each of the regions of the light-exiting surface and the provision of high luminance are taken into consideration.

For a resin sheet suited to such a light guide, a difference in refractive indexes between the adjacent resin layers is preferably from 0.03 to 0.3, more preferably from 0.05 to 0.25, particularly preferably from 0.05 to 0.20.

When a difference in the refractive indexes is too small, a change in the traveling direction of light at the interface of the resins becomes too small, and consequently the exiting ratio of light (Φ) of the light guide becomes too small. Conversely, when a difference in the refractive indexes is too large, a change in the traveling direction of light at the interface of the resins becomes excessive, and the exiting ratio of light (Φ) of the light guide becomes too large.

Examples of a preferred combination of the resins include a combination of polycarbonate, polyethylene terephthalate, polystyrene, polyethylene, or the like with polymethyl methacrylate.

When the resin sheet of the present invention is used as the light guide of a surface light source element, the exiting ratio of light of the light guide is influenced by the pitch p and the h/p ratio in FIGS. 30a to 30k and FIGS. 31a to 31h.

The h/p ratio is preferably about from 0.05 to 0.5 under the conditions that the difference in the refractive indexes between resins of any two adjacent resin layers is from 0.03 to 0.3 and that both the pitch p and the height h of the shape of the depressions and protrusions at the interface of the resin layers in the xy cross-section are constant.

The pitch of the shape of the depressions and protrusions is desirably up to 600 μm. Since the structure of the depressions and protrusions is visually observed when the pitch is larger than the value mentioned above, the resin sheet is not suitable for use in sign boards, traffic signs, liquid crystal display devices, etc., where the appearance is regarded important. When the resin sheet is used for the surface light source element of a liquid crystal display device, the pitch is desirably up to 200 μm. Although there is no specific limitation on the lower limit of the pitch of the shape of the depressions and protrusions, the lower limit is preferably about at least 50 μm in view of an ease of production.

When the resin sheet of the present invention is used as a light guide in an edge light type surface light source element as shown in FIG. 32, the direction in which the light intensity of light exiting from the surface of the light guide becomes maximum is inclined from the normal of the surface (xz plane) to the x direction at an angle of at least 50°. Accordingly, the direction of the exiting light must be deflected to namely to the normal direction, the observer's position. A light-deflecting sheet 54 is, therefore, placed on the light guide in the surface light source element of the present invention.

Examples of the light-deflecting sheet include a light diffusing sheet and a lens sheet where many columnar lens units are arranged in such a manner, at least on one side of the sheet, that the longitudinal directions of the lens units become parallel to each other.

Various shapes of lenses forming the lens sheet may be selected in accordance with the object. Examples of the shape include a prism shape, a lenticular shape and a wave shape. The pitch of the lens units of the lens sheet is preferably from 30 to 500 μm. When the lens sheet is placed, whether the lens surface is made to face the side of the light guide or the opposite side may be determined by taking the distribution of light exiting from the light guide into consideration.

When a prism sheet is used as the lens sheet, the apex angle of the prism is suitably selected in view of the distribution of exiting light from the light guide. In general, the apex angle is preferably from 50 to 120°.

In the surface light source element of the present invention, a plurality of light-deflecting sheets may optionally be used. For example, when two lens sheets are used, the two lens sheets are laminated so that the longitudinal direction of the columns of the columnar lens units in one lens sheet becomes parallel to or makes an angle with that of the columns thereof in the other lens sheet. The two lens sheets may be placed so that both of the lens surfaces face the upper side or lower side. Alternatively, the two lens sheets may be placed so that the lens surface of one lens sheet face a direction opposite to the direction of the lens surface of the other lens sheet.

When a plurality of lens sheets are to be used as light-deflecting sheets, preferred examples of using the lens sheets will be described below. Prism sheets are used as the lens sheets. A first prism sheet is placed on the surface of the light guide so that the prism surface faces the side of the light guide (namely, downward) and the longitudinal direction of the columnar prism units becomes parallel to the z axis. A second prism sheet is placed on the first prism sheet so that the prism surface faces the side opposite to the side of the light guide (namely, upward) and the longitudinal direction of the columnar prism units becomes parallel to the x axis direction. It is desirable that the apex angle of the first prism sheet be from 50 to 70° and that the apex angle of the second prism sheet be from 80 to 100°.

When only one lens sheet is used as the light-deflecting sheet, the following procedure is preferred: the prism sheet has an apex angle of 50 to 70° the prism surface faces the side of the light guide; and the longitudinal direction of the columnar lens units becomes parallel to the z axis of the surface light source element.

Furthermore, the present invention provides a resin sheet laminate having at least two resin sheets of the present invention as mentioned above which are laminated together, and in which the x direction of any one of the resin sheets deviates from that of its adjacent resin sheet at a predetermined angle. In this case, the x directions of any adjacent two resin sheets can be crossed at an angle of 0 to 90°. The crossing angle (deviation angle) is particularly preferably 90°.

Dust and foreign matter adhere with difficulty to the laminate of the present invention. The laminate gives a sheet to which an optical function such as light divisibility and adjustability of the field of view is imparted or an artistic design sheet having a deep appearance and/or a three-dimensional appearance.

The present invention will be further illustrated with reference to the following examples. In addition, methods for evaluating surface light source elements are as described below.

1. Measurement of Normal Luminance (1) Small Surface Light Source Element

Figure 33:
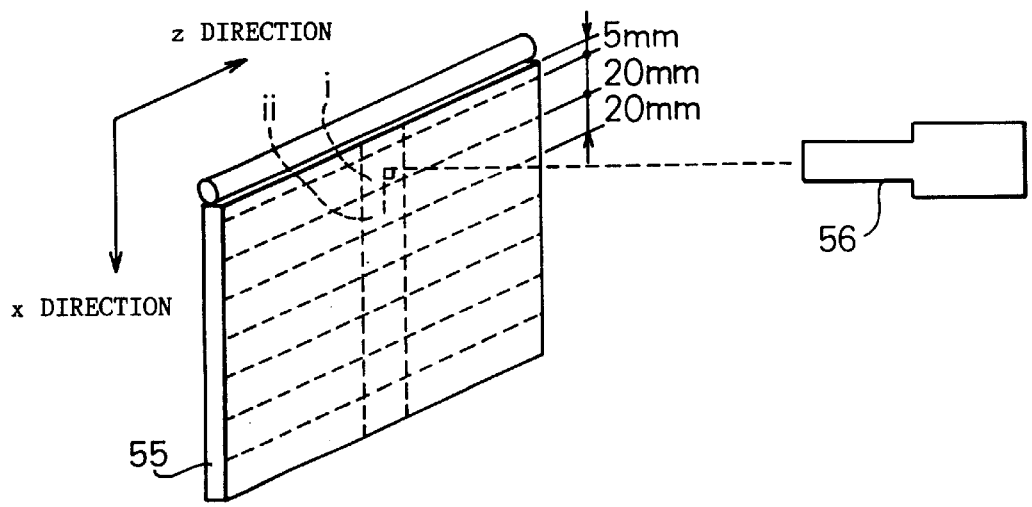
FIG. 33 is a schematic view for illustrating a method for evaluating the surface light source element in examples.

As shown in FIG. 33, a central zone of 20 mm wide in the z direction of the light-exiting surface of a surface light source element 55 is determined to be a measurement region. A rectangular zone of 5 mm wide in the x direction from a light incident surface is excluded from the measurement region, and the measurement region is divided into square regions (each region: 20×20 mm) which are termed Region i, Region ii, Region iii, - - - - Region n.

A cold-cathode tube 53 (KC130T4E, 4 mm in diameter and 130 mm long, manufactured by Matsushita Electric Industrial Co., Ltd.) placed on one end face (yz face) in the x direction of a light guide is connected to a direct voltage source through an inverter (CXA-M10L, manufactured by TDK Corporation), and lit by applying a DC voltage of 12 V.

The surface light source element is placed on a measuring table. The optical axis of a luminance meter 56 (nt–1°, manufactured by Minolta Co., Ltd.) is made to coincide with a normal to the xz plane passing through the central position of Region i. The luminance meter is then moved away from the surface light source element so that the measuring diameter becomes from 8 to 9 mm in diameter, and the luminance meter is fixed. The normal luminance of Region i is then measured, and termed Gi.

The surface light source element is then moved by 20 mm in the x direction, and the normal luminance of Region ii is measured in the same manner. The measured value is termed Gii. The normal luminance of the entire region is measured by repeating the operation.

(2) Large Surface Light Source Element

Measurements are made in the same manner as in (1) above (Small Surface Light Source Element) except that a fluorescent lamp (30 W) is used as a light source.

2. Exiting Ratio of Light

The logarithmic value of the normal luminance (log Gi, - - - - or log Gn, axis of ordinates) is plotted against the corresponding ratio of a distance from the central position of the measurement region to the light-incident end of the light guide to the thickness thereof (L'/t). The slope (K) of the straight line obtained by plotting is determined, and the exiting ratio of light ($\Phi$) is derived from the formula (2).

3. Variation (R %)

Of Gi to Gn measured in 1 above, the maximum value, the minimum value and the average value are termed $I_{max}$, $I_{min}$ and $I_{av}$, respectively, and R % is obtained from formula (3).

EXAMPLE 1

A polymethyl methacrylate (trade name of Acrypet MD, manufactured by Mitsubishi Rayon Co., Ltd.) was prepared as a resin a and a resin b, and a polycarbonate (trade name of Yupiron H-3000, manufactured by Mitsubishi Gas Chemical Co., Ltd.) was prepared as a resin c. An apparatus shown in FIGS. 1 to 5 was used. A die 8 having a slit gap of 1.7 mm at the outlet of a flow passage 31 was used for the resin c. A die 9 having the structure of a composite flow formation portion as shown in FIGS. 6 and 7 was used. The groove portions ΔRn and ΔLn were each set at 1 mm, and the pitch p of the groove portions was set at 5 mm. The widths of the portions Ln and Rn were each set at 2.5 mm (P/2).

The molding temperature was 260° C. The polycarbonate was melted in a first extruder 1, fed to the die 9 via an extrusion flow passage 13, and allowed to flow into a composite flow formation portion 22 from the flow passage 31. The polymethyl methacrylate was melted in a second extruder 2, fed to the die 8 via an extrusion flow passage 14, and allowed to flow into the composite flow formation portion 22 from flow passages 41, 42. A composite resin flow passage 21 had a width (X direction) of 50 cm and a thickness (Y direction) of 5 mm. Both resins joined together in the composite flow formation portion to form a composite resin flow, which was extruded from a composite resin flow outlet 23 to give a composite sheet having a thickness of 5 mm and a width of 50 cm.

The sheet thus obtained had a smooth surface as a whole, no warpage, and a cross-section as shown in FIG. 30a. The depressions and protrusions had a pitch of 5 mm, and an h/p ratio of 0.25. The sheet was excellent in both the appearance and the light transmittance, showed no uneven light diffusion, and was suited for use as a light diffusing plate, and the like.

EXAMPLE 2

A composite resin sheet having a thickness of 5 mm and a width of 50 cm was continuously molded in the same manner as in Example 1 except that a die 9 having the structure of a composite flow formation portion shown in FIG. 11 was used, and that the height of the flow passages 41 was set at 1 mm.

The sheet thus obtained had a smooth surface as a whole, no warpage, and a cross-sectional shape of the resin layer C as shown in FIG. 30d. The depressions and protrusions had a pitch of 5 mm, and an h/p ratio of 0.25. The sheet was excellent in both appearance and light transmittance, showed no uneven light diffusion, and was suited for use in a light illuminator cover and the like.

EXAMPLE 3

A composite resin sheet having a thickness of 3 mm and a width of 50 cm was continuously molded in the same manner as in Example 1 except in the following respects: the slit gap of the outlet of the flow passage 31 was set at 3 mm; the pitch p of the groove portions of the flow passages 41, 42 was set at 1.5 mm; and the width of the portions Ln and Rn was set at 0.75 mm (P/2).

The sheet thus obtained had a smooth surface as a whole, no warpage, and the cross-sectional shape of the resin layer C as shown in FIG. 30a. The depressions and protrusions had a pitch of 1.5 mm, and an h/p ratio of 0.25. The sheet was excellent in both appearance and light transmittance, showed no uneven light diffusion, and was suited for use in a light diffusing plate and the like.

EXAMPLE 4

A composite resin sheet having a thickness of 3 mm and a width of 50 cm was continuously molded in the same manner as in Example 1 except that the flow passage set so that it made an angle Φ of 60° with the YZ plane.

The sheet thus obtained had a smooth surface as a whole, no warpage, and the cross-sectional shape of the resin layer C as shown in FIG. 30c. The depressions and protrusions had a pitch of 5 mm, and an h/p ratio of 0.25. The sheet was excellent in both appearance and light transmittance.

EXAMPLE 5

A composite resin sheet having a thickness of 5 mm and a width of 50 cm was continuously molded in the same manner as in Example 1 except that a die 9, having a structure wherein the portions Ln of the flow passages 41 and the portions Rm of the flow passages 42 were symmetrically arranged with respect to the XZ plane including the flow passage 31, and the portions Lm of the flow passages 41 and the portions Rn of the flow passages 42 were symmetrically arranged with respect thereto, was used.

Figure 29F:
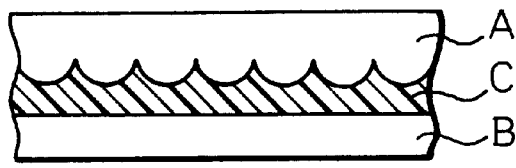
Figure 29G:
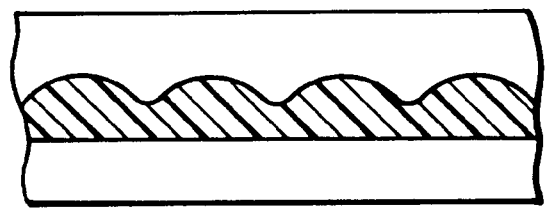
Figure 29H:
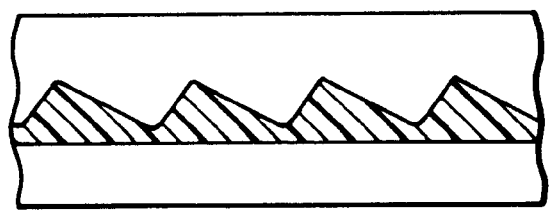
Figure 29I:

The sheet thus obtained had a smooth surface as a whole, no warpage, and the cross-sectional shape of the resin layer C as shown in FIG. 29f. The depressions and protrusions had a pitch of 5 mm. The sheet was excellent in both appearance and light transmittance and was suited for use in a light diffusing plate and the like.

EXAMPLE 6

A sheet having a thickness of 3 mm and a width of 60 cm was continuously molded in the same manner as in Example 1 except in the following respects: the thickness (Y direction) and the width (X direction) of the composite resin flow passage 21 were set at 3 mm and 60 cm, respectively; the slit gap of the outlet of the flow passage 31 was set at 2.6 mm; the pitch p of the groove portions was set at 0.3 mm; and the width of the portions Ln and Rn was set at 0.15 mm (P/2).

Figure 30H:
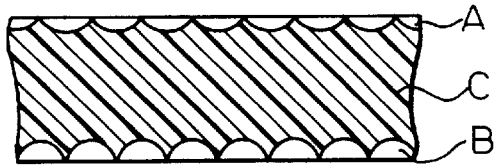
Figure 30E:
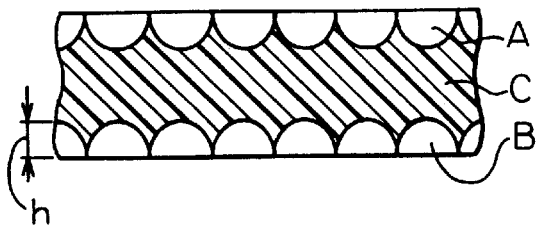
Figure 30I:
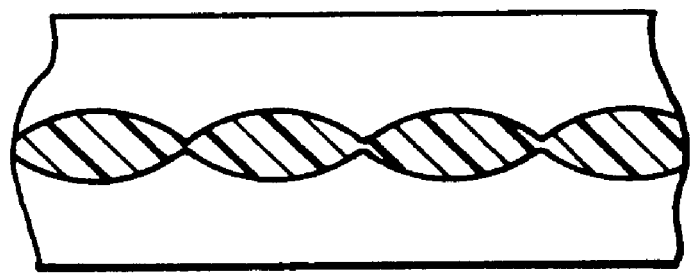
Figure 30J:
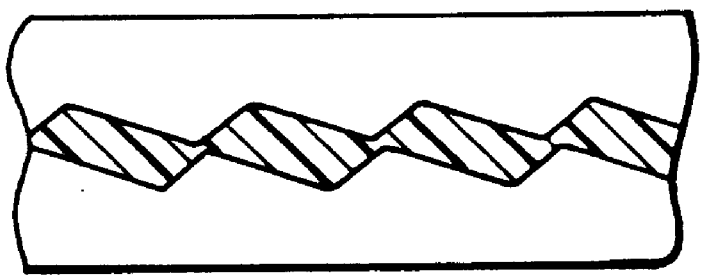
Figure 30K:
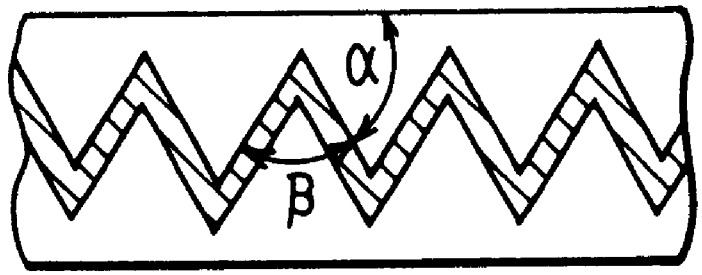

The sheet thus obtained had a smooth surface as a whole, no warpage, and the cross-sectional shape as shown in FIG. 30e. The depressions and protrusions had a pitch of 0.3 mm, and an h/p ratio of 0.15. The sheet was excellent in both appearance and light transmittance, showed no uneven light diffusion, and was suited for use in a light diffusing plate, a light guide, and the like.

EXAMPLE 7

A sheet having a thickness of 2.5 mm and a width of 25 cm was continuously molded in the same manner as in Example 6 except for the following respects: the thickness (Y direction) and the width (X direction) of the composite resin flow passage 21 were set at 5 mm and 50 cm, respectively; a die 44 shown in FIG. 18, and FIGS. 19a, 19b was arranged at the outlet of the composite resin flow passage 21; the width (X direction) of the outlet was narrowed to ½ (25 cm) of that of the inlet, and the thickness (Y direction) of the outlet was narrowed to ½(2.5 mm) of that of the inlet.

The sheet thus obtained had a smooth surface as a whole, no warpage, and the cross-sectional shape as shown in FIG. 30a. The depressions and protrusions had a pitch p of 0.15 mm, and an h/p ratio of 0.25. The sheet showed optical characteristics as excellent as the sheet in Example 6.

EXAMPLE 8

A composite resin sheet having a thickness of 1.67 mm and a width of 16.7 cm was continuously molded in the same manner as in Example 7 except that a die shown in FIG. 18, and FIGS. 19a and 19b was arranged at the outlet of the composite resin flow passage 21, and that the width (X direction) of the outlet was narrowed to ⅓ (16.7 cm) and the thickness (Y direction) of the outlet was narrowed to ⅓ (1.67 mm) of the inlet.

The sheet thus obtained had a smooth surface as a whole, no warpage, and the cross-sectional shape as shown in FIG. 30a. The depressions and protrusions had a pitch of 0.1 mm, and an h/p ratio of 0.25. The sheet showed optical characteristics as excellent as the sheet in Example 6.

EXAMPLE 9

A composite resin sheet having a thickness of 3 mm and a width of 60 cm was continuously molded in the same manner as in Example 6 except that the flow passages 41, 42 had a structure in which the positions of the portions Ln and the portions Rn are relatively shifted by p/2 as shown in FIG. 11.

The sheet thus obtained had a smooth surface as a whole, no warpage, and a cross-sectional shape in which the pitch of the upper protrusions and that of the lower protrusions were relatively shifted by p/2 as shown in FIG. 30h.

EXAMPLE 10

A composite resin sheet having a thickness of 3 mm and a width of 60 cm was continuously molded in the same manner as in Example 6 except for the following respects: the thickness (Y direction) of the composite resin flow passage 21 was set at 3 mm; the thickness (Y direction of the flow passage 31 was set at 0.5 mm; the pitch p of the groove portions of the flow passages 41, 42 was set at 0.3 mm; and the width of the portions Ln and Rn was set at 0.1 mm (p/3).

The sheet thus obtained had a smooth surface as a whole, no warpage, and the cross-sectional shape shown in FIG. 30f.

EXAMPLE 11

A composite resin sheet having a thickness of 3 mm and a width of 60 cm was continuously molded in the same manner as in Example 6 except for the following respects: the thickness (Y direction) of the composite resin flow passage 21 was set at 3 mm; the thickness (Y direction) of the flow passage 31 was set at 2.8 mm; the pitch p of the groove portions of the flow passages 41, 42 was set at 0.15 mm; and the width of the portions Ln and Rn was set at 0.075 mm (p/2).

The sheet thus obtained had a smooth surface as a whole, no warpage, and the cross-sectional shape shown in FIG. 30e.

EXAMPLE 12

A composite resin sheet having a thickness of 10 mm and a width of 60 cm was continuously molded in the same manner as in Example 6 except for the following respects: the thickness (Y direction) of the composite resin flow passage 21 was set at 10 mm; the thickness (Y direction) of the flow passage 31 was set at 9.6 mm; the pitch p of the groove portions of the flow passages 41, 42 was set at 0.5 mm; and the width of the portions Ln and Rn was set at 0.25 mm (p/2).

The sheet thus obtained had a smooth surface as a whole, no warpage, and the cross-sectional shape shown in FIG. 30e.

EXAMPLE 13

The same polymethyl methacrylate as in Example 1 was used as the resin a, and the same polycarbonate as in Example 1 was used as the resin b. The apparatus shown in FIGS. 1, 2, 20, 21, 22 was used. The groove portions ΔRn an ΔLn were each set at 1 mm, and the pitch p of the groove portions was set at 5 mm. The width of the portions Ln and Rn was set at 2.5 mm (p/2).

The molding temperature was 260° C. The polymethyl methacrylate was melted in a first extruder 1, fed to the die 9 via the extrusion flow passage 13, and allowed to flow into the composite flow formation portion 22 from the flow passages 41. The polycarbonate was melted at the same time in a second extruder 2, fed to the die 9 via the extrusion flow passage 14, and allowed to flow into the composite flow formation portion 22 from the flow passages 42. Both resins were allowed to flow into the composite flow formation portion to form a composite resin flow, which was extruded from the composite flow outlet 23 to give a composite resin sheet having a thickness of 5 mm and a width of 50 cm.

The sheet thus obtained had a smooth surface as a whole, no warpage, and the cross-sectional shape shown in FIG. 31b. The apex angle β was about 90°. The depressions and protrusions had a pitch of 5 mm. The sheet was excellent in both the appearance and the light transmittance, showed no uneven light diffusion, and was suited for use in a light diffusing plate, and the like.

EXAMPLE 14

A composite resin sheet having a thickness of 5 mm and a width of 50 cm was continuously molded in the same manner as in Example 13 except that a die 9 having the structure of a composite flow formation portion shown in FIG. 23 was used, and that the height of the flow passages 41 was set at 1 mm.

The sheet thus obtained had a smooth surface as a whole, no warpage, and the cross-sectional shape shown in FIG. 24 or FIG. 31c. The apex angle β was about 90°. The depressions and protrusions had a pitch of 5 mm. The sheet showed optical characteristics as excellent as the sheet in Example 13.

EXAMPLE 15

A composite resin sheet having a thickness of 3 mm and a width of 50 cm was continuously molded in the same manner as in Example 13 except for the following respects: the thickness (Y direction) of the composite resin flow passage 21 was set at 3 mm; the pitch p of the groove portions of the flow passages 41, 42 was set at 2 mm; and the width of the portions Ln, Rn was set at 1 mm (p/2).

The sheet thus obtained had a smooth surface as a whole, no warpage, and the cross-sectional shape shown in FIG. 31b. The apex angle β was about 60°. The depressions and protrusions had a pitch of 2 mm. The sheet showed optical characteristics as excellent as the sheet in Example 13.

EXAMPLE 16

A composite resin sheet having a thickness of 5 mm and a width of 50 cm was continuously molded in the same manner as in Example 13 except that the flow passages were allowed to make an angle of 60° with the YZ plane as shown in FIG. 28.

The sheet thus obtained had a smooth surface as a whole, no warpage, and the cross-sectional shape shown in FIG. 31e. The apex angle β was about 90°, and the angle α was about 25°. The depressions and protrusions had a pitch of 5 mm. The sheet was excellent in both appearance and light transmittance.

EXAMPLE 17

A composite resin sheet having a thickness of 3 mm and a width of 50 cm was continuously molded in the same manner as in Example 13 except for the following respects: the thickness (Y direction) of the composite resin flow passage 21 was set at 3 mm; the pitch p of the groove portions of the flow passages 41, 42 was set at 0.3 mm; and the width of the portions Ln, Rn was set at 0.1 mm (p/3).

Figure 31H:
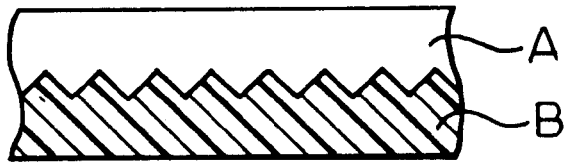

The sheet thus obtained had a smooth surface as a whole, no warpage, and the cross-sectional shape shown in FIG. 31h.

EXAMPLE 18

This is an example of a small surface light source element.

The composite resin sheet obtained in Example 6 was cut to give a light guide (small surface light source element) for measuring the exiting ratio of light having a length of 100 mm in the z direction and a length of 300 mm in the x direction. A PET (polyethylene terephthalate) film coated with silver by vapor deposition was stuck on the two xy end surfaces in the longitudinal direction of the light guide with an adhesive, and the back surface of the light guide was covered with a PET film coated with silver by vapor deposition using an adhesive tape, whereby a reflecting surface was formed. Moreover, a cold-cathode tube was placed by the side of one of the yz end surfaces of the light guide so that the longer side of the tube was arranged in the z direction. The cold-cathode tube and the light guide were covered with a PET film coated with silver by vapor deposition.

On the other hand, many columnar prism units each having an apex angle of 63° were formed at a pitch of 50 μm on a PET film with an UV-ray cured acrylic resin having a refractive index of 1.53 so that the longitudinal directions of the columnar prism units were parallel to each other, whereby a prism sheet was produced.

The prism sheet was placed on the surface of the light guide so that the prism surface faced downwardly and the longitudinal direction of the prism units was in the z direction. The exiting ratio of light of the small surface light source element thus prepared was evaluated, and the results shown in Table 1 were obtained.

The composite resin sheet obtained in Example 6 was cut to give a light guide having a length of 100 mm in the z direction and a length of 105 mm in the x direction, in the same manner as mentioned above. A PET (polyethylene terephthalate) film coated with silver by vapor deposition was stuck on the two xy end surfaces and one yz end surface of the light guide with an adhesive. A cold-cathode tube was placed by the side of the other yz end surface. A small surface light source element for evaluating the variation of the exiting ratio of light was prepared while the other conditions were the same as mentioned above, and the results as shown in Table 1 were obtained.

EXAMPLES 19 to 21

Small surface light source elements were prepared from the composite resin sheets obtained in Examples 9, 11 and 17, and their performance was evaluated. The results shown in Table 1 were obtained.

Comparative Example 1

Figure 34:
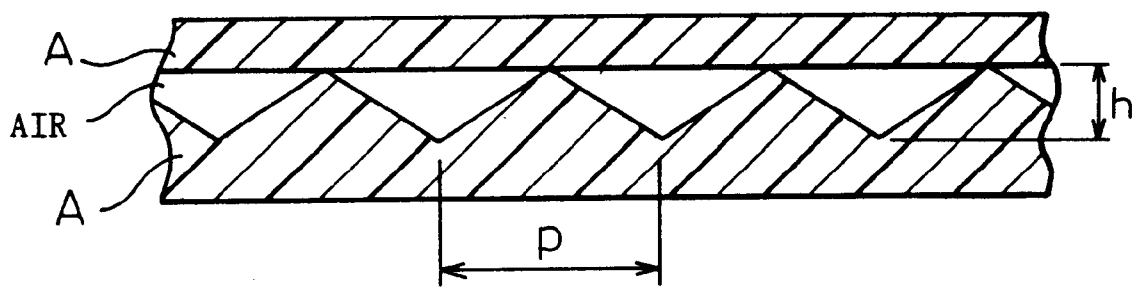
FIG. 34 is a cross-sectional view showing the structure of a resin sheet obtained in Comparative Example and internally having an air layer.

Two acrylic resin plates each measuring 1.5×100 (z direction)×300 mm (x direction) were prepared. Columnar prisms were formed (pitch: 0.1 mm, h/p ratio: 0.25) on one surface of one of the resin plates by thermal transfer with a mold, in parallel with the z direction of the plate. The other acrylic resin plate was stacked on the plate with its prism-formed surface faced upward, and bonded thereto to give a light guide having hollow depressions and protrusions (FIG. 34). A small surface light source element for evaluating the exiting ratio of light was prepared in the same manner as in Example 18, and the performance was evaluated. The results as shown in Table 1 were obtained.

Two acrylic resin plates each measuring 1.5 mm×100 mm (z direction)×105 mm (x direction) were prepared, and a small surface light source element for evaluating the variation was prepared in the same manner as mentioned above. The performance was evaluated, and the results shown in Table 1 were obtained.

The surface light source elements thus obtained each showed a high exiting ratio of light, and a large variation.

Comparative Example 2

Using a mold having a roughened surface formed by blasting a stainless steel sheet having a mirror-finished surface with glass beads, the roughened surface was thermally transferred to one major surface of a transparent acrylic plate measuring 3×100 (z direction)×300 mm (x direction) to give a light guide. Moreover, the roughened surface was thermally transferred to one major surface of a transparent acrylic resin plate measuring 3×100 (z direction)×105 mm (x direction) to give a light guide. Small surface light source elements were prepared using these light guides, in the same manner as in Example 21. The performance was evaluated, and the results shown in Table 1 were obtained.

The surface light source elements thus obtained each showed a high exiting ratio of light, and a large variation.

Comparative Example 3

The back surface of an acrylic resin plate measuring 3×100 (z direction)×105 mm (x direction) was screen printed with a spotted pattern using a white paint containing titanium oxide particles. The density of the spots was lowered near the light-incident end surface, and increased with a distance in the x direction from the light-incident surface. The resultant acrylic resin plate was used as a light guide, and a small surface light source element was prepared therefrom in the same manner as in Example 21. The performance of the element was evaluated, and the results as shown in Table 1 were obtained.

Although the surface light source element thus obtained showed a small variation, a spotted pattern was observed through a prism.

EXAMPLE 22

This is an example of a large surface light source element.

The resin sheet obtained in Example 12 was cut to give two light guides each measuring 10×600 (z direction)×1,000 mm (x direction).

Large surface light source elements for evaluating the exiting ratio of light and the variation were prepared using the large light guides, in the same manner as in Example 18. The performance of the light source elements was evaluated, and the results shown in Table 1 were obtained.

Comparative Example 4

A large surface light source element as shown in Table 1 was prepared in the same manner as in Comparative Example 1. The performance of the light source element was evaluated, and the results shown in Table 1 were obtained.

TABLE 1

| | | Shape of depressions and protrusions | | | Size of light guide z × x × y (mm) | | | Optical characteristics | |
|---|---|---|---|---|---|---|---|---|---|
| Ex. No. | Resin sheet | Shape of depressions and protrusions | Pitch p (mm) | h (height) /p (pitch) | | | | Variation (R%) | Exiting ratio of light (%) |
| Ex. 18 | Ex. 6 | FIG. 30e | 0.3 | 0.15 | 100 | 105 | 3 | 19 | 1.91 |
| Ex. 19 | Ex. 9 | FIG. 30h | 0.3 | 0.15 | 100 | 105 | 3 | 14 | 1.67 |
| Ex. 20 | Ex. 11 | FIG. 30e | 0.15 | 0.15 | 100 | 105 | 3 | 18 | 1.89 |
| Ex. 21 | Ex. 17 | FIG. 31h | 0.3 | 0.36 | 100 | 105 | 3 | 15 | 1.71 |
| Comp. Ex. 1 | | hollow | 0.3 | 0.25 | 100 | 105 | 3 | 182 | 6.83 |

TABLE 1-continued

| Ex. No. | Resin sheet | Shape of depressions and protrusions | | | Optical characteristics | |
|---|---|---|---|---|---|---|
| | | Shape of depressions and protrusions | Pitch p (mm) | h (height) /p (pitch) | Size of light guide z × x × y (mm) | Variation (R%) | Exiting ratio of light (%) |
| Comp. Ex. 2 | | FIG. 34 surface-sand blasted | | | 100  105  3 | 83 | 4.62 |
| Comp. Ex. 3 | | dot-printed | | | 100  105  3 | 12 | — |
| Ex. 22 | Ex. 12 | FIG. 30e | 0.5 | 0.15 | 600  1000  10 | 155 | 1.87 |
| Comp. Ex. 4 | | hollow FIG. 34 | 0.5 | 0.25 | 600  1000  10 | 800 | 7.02 |

EXAMPLE 23

This is an embodiment of a laminate.

A composite resin sheet having a thickness of 3 mm and a width of 50 cm was prepared in the same manner as in Example 1 except for the following respects: the pitch p of the groove portions was set at 3 mm; the width of the portions Ln, Rn was set at 1.5 mm (p/2); and a polymethyl methacrylate (trade name of Acrypet VH, manufactured by Mitsubishi Rayon Co., Ltd.) was used as the resin layer a.

The shape of the cross-sectional depressions and protrusions of the sheet thus obtained was sawtooth-like as shown in FIG. 31b, and the depressions and protrusions had a pitch p of 3 mm, a height h of 1.5 mm, an angle α of 450° and an apex angle β of 90°.

Two of the resin sheets were laminated with methylene chloride used as an adhesive so that the x direction of one of the sheets crossed the x direction of the other at an angle of 90° and both resin layers B faced the inner side of the laminate to give a resin sheet laminate having a thickness of 6 mm, a longitudinal length of 50 cm and a transverse length of 50 cm.

The laminate thus obtained had a grid-like pattern having a deep appearance and a three-dimensional appearance, exhibited an excellent light transmittance and light divisibility, and had an appearance of high grade the color tone of which the appearance changed depending on a viewing angle due to a reflection effect, a diffusion effect, and an effect of light at the interface of the depressions and the protrusions within the laminate.

EXAMPLE 24

Two of the resin sheets (FIG. 30d) obtained in Example 2 were laminated with methylene chloride as an adhesive so that the x direction of one of the sheets crossed the x direction of the other sheet at an angle of 90° to give a resin sheet laminate having a thickness of 6 mm, a longitudinal length of 50 cm and a transverse length of 50 cm.

The laminate thus obtained showed a performance equivalent to that of the laminate in Example 23.

EXAMPLE 25

A resin sheet laminate was prepared in the same manner as described in Example 24 from two of the resin sheets (FIG. 30h) obtained in Example 9.

The laminate thus obtained showed a performance equivalent to that of the laminate in Example 23.

Industrial Applicability

The resin sheet of the present invention is applicable to various objects and uses such as a light diffusible sheet suitable for an illuminator cover, a lighting window, a building material, a traffic sign, a sign board, a liquid crystal display device, etc., and an artistic design sheet having a deep appearance and/or a three-dimensional appearance, and is, therefore, extremely useful in industry. Furthermore, a surface light source element can be obtained by using the resin sheet as a light guide, and a useful laminate can be obtained by laminating such resin sheets.

What is claimed is:

1. A surface light source element comprising:
   a resin sheet having a laminate structure in which a transparent resin layer C is sandwiched between and adjacent each of a transparent resin layer A and a transparent resin layer B, and a smooth an outer surface, any two adjacent resin layers of the three resin layers having refractive indexes which differ from each other, in a cross-section represented by an xy plane wherein y is a thickness direction of the a resin sheet, and x is a width direction thereof, at least one of two interfaces formed between the resin layers A and C and between the resin layers B and C having an uneven shape formed by repeated plural depressions and protrusions, as a light guide,
   a reflective material arranged on a lower surface of the light guide,
   a light source placed at least on one end surface (yz plane) in an x direction of the light guide, and
   a light-deflecting sheet placed on an upper surface of the light guide and having a function of changing a direction of light which is allowed to exit from a surface thereof to a normal direction thereof.

2. The surface light source element according to claim 1, wherein the uneven shape at an interface of resin layers in an xy cross-section of the resin sheet has a pitch p of 50 to 600 μm.

3. The surface light source element according to claim 2, wherein the pitch p of the uneven shape is 50 to 200 μm.

4. A surface light source element comprising:
   a resin sheet having a laminate structure of a transparent resin layer A adjacent a transparent resin layer B, and an outer surface, the adjacent resin layers having reflective indexes which differ from each other, in a cross-section represented by an xy plane wherein y is a thickness direction of the resin sheet, and x is a width direction thereof, an interface formed between the resin layers A and B and having an uneven shape formed by repeated plural depressions and protrusions, as a light guide, a reflective material arranged on a lower surface of the light guide, a light source placed at least on one end surface (yz plane) in an x direction of the light guide, and a light-deflecting sheet placed on an upper surface thereof and having a function of changing a direction of light which is allowed to exit from a surface thereof to a normal direction thereof.

5. The surface light source element according to claim 4, wherein the uneven shape at an interface of resin layers in an xy cross-section of the resin sheet has a pitch p of 50 to 600 $\mu$m.

6. The surface light source element according to claim 5, wherein the pitch p of the uneven shape is 50 to 200 $\mu$m.

* * * * *